(12) United States Patent
Maton et al.

(10) Patent No.: US 8,084,535 B2
(45) Date of Patent: *Dec. 27, 2011

(54) ORGANOSILOXANE COMPOSITIONS

(75) Inventors: Isabelle Maton, Braine L'alleud (BE);
Giuseppina Lavinaro, Trivieres (BE);
Jean Willieme, Quaregnon (BE);
Tommy Detemmerman,
Wezembeek-Oppem (BE); Robert Drake, Penarth (GB)

(73) Assignee: Dow Corning Corporation, Midland, MN (US)

( * ) Notice: Subject to any disclaimer, the term of this patent is extended or adjusted under 35 U.S.C. 154(b) by 509 days.

This patent is subject to a terminal disclaimer.

(21) Appl. No.: 11/910,701

(22) PCT Filed: Apr. 3, 2006

(86) PCT No.: PCT/GB2006/050072
§ 371 (c)(1),
(2), (4) Date: May 22, 2008

(87) PCT Pub. No.: WO2006/106359
PCT Pub. Date: Oct. 12, 2006

(65) Prior Publication Data
US 2008/0312366 A1    Dec. 18, 2008

(30) Foreign Application Priority Data

Apr. 6, 2005 (GB) .................... 0506939.8
Aug. 6, 2005 (GB) .................... 0516239.1

(51) Int. Cl.
*C08L 83/04* (2006.01)
(52) U.S. Cl. ........ 524/837; 524/700; 524/710; 524/731; 524/765; 524/773; 524/774
(58) Field of Classification Search .............. None
See application file for complete search history.

(56) References Cited

U.S. PATENT DOCUMENTS

| | | | |
|---|---|---|---|
| 3,220,879 A | 11/1965 | Stare et al. | |
| 3,308,203 A | 3/1967 | Metevia et al. | |
| 3,341,486 A | 9/1967 | Murphy | |
| 3,378,520 A | 4/1968 | Noll et al. | |
| 3,419,593 A | 12/1968 | Willing | |
| 3,427,270 A | 2/1969 | Northrup | |
| 3,433,765 A | 3/1969 | Geipel | |
| 3,480,583 A | 11/1969 | Bailey et al. | |
| 3,715,334 A | 2/1973 | Karstedt | |
| 3,814,730 A | 6/1974 | Karstedt | |
| 3,817,894 A | 6/1974 | Butler et al. | |
| 3,839,388 A | 10/1974 | Nitzsche et al. | |
| 3,923,705 A | 12/1975 | Smith | |
| 3,957,842 A | 5/1976 | Prokai et al. | |
| 3,962,160 A | 6/1976 | Beers et al. | |
| 3,971,751 A | 7/1976 | Isayama et al. | |
| 4,020,044 A | 4/1977 | Crossan et al. | |
| 4,022,941 A | 5/1977 | Prokai et al. | |
| 4,071,498 A | 1/1978 | Frye et al. | |
| 4,147,855 A | 4/1979 | Schiller et al. | |
| 4,240,450 A | 12/1980 | Grollier et al. | |
| 4,247,445 A | 1/1981 | Smith, Jr. et al. | |
| 4,312,801 A | 1/1982 | Hiriart Bodin et al. | |
| 4,357,438 A | 11/1982 | Sattlegger et al. | |
| 4,358,558 A | 11/1982 | Shimizu | |
| 4,433,096 A | 2/1984 | Bokerman et al. | |
| 4,472,563 A | 9/1984 | Chandra et al. | |
| 4,486,567 A | 12/1984 | Bowman et al. | |
| 4,515,834 A | 5/1985 | Fukayama et al. | |
| 4,564,693 A | 1/1986 | Riederer | |
| 4,568,701 A * | 2/1986 | Hopkins, Jr. | 521/112 |
| 4,568,707 A | 2/1986 | Voigt et al. | |
| 4,599,438 A | 7/1986 | White et al. | |
| 4,614,760 A | 9/1986 | Homan et al. | |
| 4,655,767 A | 4/1987 | Woodard et al. | |
| 4,701,490 A | 10/1987 | Burkhardt et al. | |
| 4,824,891 A | 4/1989 | Laurent et al. | |
| 4,902,499 A | 2/1990 | Bolich, Jr. et al. | |
| 4,902,575 A | 2/1990 | Yukimoto et al. | |
| 4,906,707 A | 3/1990 | Yukimoto et al. | |
| 4,918,121 A | 4/1990 | Peccoux et al. | |
| 4,965,311 A | 10/1990 | Hirose et al. | |
| 4,968,766 A | 11/1990 | Kendziorski | |
| 4,985,476 A | 1/1991 | Endres et al. | |
| 4,990,555 A | 2/1991 | Trego | |
| 5,000,029 A * | 3/1991 | Laurent et al. | 72/466.8 |
| 5,043,012 A | 8/1991 | Shinohara et al. | |
| 5,063,270 A | 11/1991 | Yukimoto et al. | |
| 5,175,325 A | 12/1992 | Brown et al. | |
| 5,210,129 A | 5/1993 | de la Croi Habimana et al. | |
| 5,286,787 A * | 2/1994 | Podola et al. | 524/773 |

(Continued)

FOREIGN PATENT DOCUMENTS

CN          1346384 A       4/2002

(Continued)

OTHER PUBLICATIONS

Article: Kirk-Othmer, "Silicone Compounds", Encyclopedia of Chemical Technology, 4th edition, vol. 22, 1997, pp. 107-109.

(Continued)

*Primary Examiner* — Marc Zimmer
(74) *Attorney, Agent, or Firm* — Howard & Howard Attorneys PLLC

(57) ABSTRACT

A method of making a diluted organopolysiloxane containing polymer comprising the steps of:—
(i) Preparing an organopolysiloxane containing polymer by reacting a siloxane containing material with:—
(a) one or more organopolysiloxane polymers(s) or
(b) one or more organic polymers(s) via an addition reaction pathway in the presence of an extender and/or plasticiser, a suitable catalyst and optionally an end-blocking agent; and
(iii) Where required quenching the polymerisation process;
wherein the extender and/or plasticiser is substantially retained within the resulting diluted organopolysiloxane containing polymer.

33 Claims, No Drawings

U.S. PATENT DOCUMENTS

| | | | |
|---|---|---|---|
| 5,300,612 | A | 4/1994 | Saruyama |
| 5,350,824 | A | 9/1994 | Kobayashi |
| 5,534,588 | A | 7/1996 | Knepper et al. |
| 5,569,750 | A | 10/1996 | Knepper et al. |
| 5,863,976 | A | 1/1999 | Schneider |
| 5,914,382 | A | 6/1999 | Friebe et al. |
| 5,973,060 | A | 10/1999 | Ozaki et al. |
| 5,981,680 | A | 11/1999 | Petroff et al. |
| 6,451,440 | B2 | 9/2002 | Atwood et al. |
| 6,545,104 | B1 | 4/2003 | Mueller et al. |
| 6,599,633 | B1 | 7/2003 | Wolf et al. |
| 6,833,407 | B1 | 12/2004 | Ahmed et al. |
| 7,605,203 | B2 | 10/2009 | Feng et al. |
| 7,754,800 | B2 | 7/2010 | Maton et al. |
| 2003/0105260 | A1 | 6/2003 | Cook et al. |
| 2004/0122199 | A1 | 6/2004 | Scheim et al. |
| 2005/0054765 | A1 | 3/2005 | Putzer |
| 2008/0312365 | A1 | 12/2008 | Maton et al. |
| 2008/0312366 | A1 | 12/2008 | Maton et al. |
| 2008/0312367 | A1 | 12/2008 | Maton et al. |
| 2009/0215944 | A1 | 8/2009 | Maton et al. |
| 2009/0234052 | A1 | 9/2009 | Maton et al. |

FOREIGN PATENT DOCUMENTS

| | | | |
|---|---|---|---|
| DE | 2653499 | A1 | 6/1978 |
| DE | 2802170 | A1 | 7/1979 |
| DE | 3217516 | A1 | 11/1983 |
| DE | 3342027 | C1 | 5/1985 |
| DE | 3342026 | A1 | 7/1985 |
| EP | 0043501 | A1 | 1/1982 |
| EP | 0093918 | A1 | 11/1983 |
| EP | 0154922 | A2 | 9/1985 |
| EP | 0196565 | A1 | 10/1986 |
| EP | 0215470 | A2 | 3/1987 |
| EP | 0277740 | A2 | 8/1988 |
| EP | 0315333 | A2 | 5/1989 |
| EP | 0378420 | A2 | 7/1990 |
| EP | 0382365 | A2 | 8/1990 |
| EP | 0397036 | A2 | 11/1990 |
| EP | 0537785 | A1 | 4/1993 |
| EP | 0651022 | A2 | 5/1995 |
| EP | 0679674 | A2 | 11/1995 |
| EP | 0801101 | A1 | 10/1997 |
| EP | 0802233 | A2 | 10/1997 |
| EP | 0807667 | A2 | 11/1997 |
| EP | 0842974 | A1 | 5/1998 |
| EP | 0860459 | A2 | 8/1998 |
| EP | 0860461 | A2 | 8/1998 |
| EP | 0885921 | A2 | 12/1998 |
| EP | 0909778 | A1 | 4/1999 |
| EP | 0982346 | A1 | 3/2000 |
| EP | 1008598 | A2 | 6/2000 |
| EP | 1041119 | A2 | 10/2000 |
| EP | 1138715 | A1 | 10/2001 |
| EP | 1252252 | A2 | 10/2002 |
| EP | 1368426 | A2 | 12/2003 |
| EP | 1254192 | B1 | 8/2004 |
| EP | 1481038 | A2 | 12/2004 |
| GB | 895091 | | 5/1962 |
| GB | 918823 | | 2/1963 |
| GB | 1289526 | | 9/1972 |
| GB | 1490240 | | 10/1977 |
| GB | 2012789 | A | 8/1979 |
| GB | 2041955 | A | 9/1980 |
| GB | 2252975 | A | 8/1992 |
| JP | 59100136 | A | 6/1984 |
| JP | 59176326 | A | 10/1984 |
| JP | 63083167 | A | 4/1988 |
| JP | 01152131 | | 6/1989 |
| JP | 01152156 | | 6/1989 |
| JP | 05178996 | | 7/1993 |
| JP | 06016813 | | 1/1994 |
| JP | 9506667 | | 6/1997 |
| JP | 20000026726 | | 1/2000 |
| JP | 2000103857 | A | 4/2000 |
| JP | 20003252996 | A | 9/2003 |
| WO | WO 9532245 | A1 | 11/1995 |
| WO | WO 99/06473 | A1 | 2/1999 |
| WO | WO 99/65979 | A1 | 12/1999 |
| WO | WO 99/66012 | A2 | 12/1999 |
| WO | WO 00/27910 | A1 | 5/2000 |
| WO | WO 00/61672 | A1 | 10/2000 |
| WO | WO 0061672 | A1 | 10/2000 |
| WO | WO 01/53425 | A2 | 7/2001 |
| WO | WO 01/79330 | A1 | 10/2001 |
| WO | WO 02/062893 | A2 | 8/2002 |
| WO | WO 03/006530 | A1 | 1/2003 |
| WO | WO 03/074634 | A2 | 9/2003 |
| WO | WO 2005/103117 | A1 | 11/2005 |

OTHER PUBLICATIONS

English language abstract for DE 3217516.
English language abstract for DE 3342026.
English language abstract for DE 3342027.
English language abstract for EP 0043501.
English language abstract for EP 0093918.
English language abstract for EP 0215470.
English language abstract for EP 0801101.
English language abstract for EP 0807667.
English language abstract for EP 0885921.
PCT International Search Report for PCT/GB2006/050075, Jul. 28, 2006, 4 pages.
PCT International Search Report for PCT/GB2006/050074, Aug. 2, 2006, 4 pages.
PCT International Search Report for PCT/GB2006/050073, Aug. 2, 2006, 5 pages.
PCT International Search Report for PCT/EB2006/061285, Jul. 28, 2006, 4 pages.
PCT International Search Report for PCT/US2006/011986, Aug. 2, 2006, 3 pages.
English language abstract for CN 1346384.
Dictionary of Chemistry and Chemical Technology, 2 pages (title page and p. 1250); Author: Hua xue hua gong da ci dian bian wei hui.; Hua xue gong ye chu ban she. Ci shu bian ji bu Publisher: Hua xue gong ye chu ban she, 2003 ISBN: 7502526110 9787502526115.
Mark E. Van Dyke, et al., Reaction Kinetics for the Anionic Ring-Opening Polymerization of Tetraphenyletramethylcyclo-Tetrasiloxane Using a Fast Catalyst System, 2 pages.
Aart Molenberg, et al., A Fast Catalyst System for the Ring-Opening Polymerization of Cyclosiloxanes, Macromol, Rapid Commun. 16, 449-453 (1995), 5 pages.
Reinhard Schwesinger, Extremely Strong, Uncharged Auxiliary Bases; Monomeric and Polymer-Supported Polyaminophosphazenes (P2-P5), 1996, 27 pages.
A.W. Karlin, et al., Uber Syntheseverfahren von Siloxanelastomeren, 5 pages.
English language abstract for JP01152131.
English language abstract for JP01152156.
English language translation and abstract for JP05178996.
English language translation and abstract for JP06016813.
English language translation and abstract for JP2000026726.
English language translation and abstract for JP2000103857.
English language translation and abstract for JP2003252996.
English language translation and abstract for JP5178996.
English language abstract for JP63083167.
International Search Report for Application No. PCT/GB2006/050072 dated Jul. 21, 2006, 4 pages.
Ye Min, "Flame-and Oil-Resistant Silicone Rubber," World Rubber Industry, vol. 28, No. 4 published Aug. 20, 2001, pp. 11-13.

* cited by examiner

ORGANOSILOXANE COMPOSITIONS

RELATED APPLICATIONS

This application claims priority to and all the advantages of International Patent Application No. PCT/GB2006/050072, filed on Apr. 3, 2006, which claims priority to Great Britain Patent Application Nos. GB 0506939.8 and GB 0516239.1, filed on Apr. 6, 2005 and Aug. 6, 2005 respectively.

This invention is concerned with the addition copolymerisation of silicon containing co-polymers in the presence of an extender and/or plasticiser and compositions containing the resulting polymers.

One route to the preparation of organopolysiloxane based copolymers is by way of addition polymerisation such as via hydrosilylation routes, typically involving the polymerisation, of monomers/oligomers having Si—H terminal groups, (typically organopolysiloxanes) with siloxane and/or organic monomers/oligomers having unsaturated terminal groups, typically alkenyl or alkynyl terminal groups, resulting in hydrolytically stable co-polymers linked, for example, by silicone to silicone (Si—Si) and/or silicone to carbon (Si—C) linkages. These include co-polymers produced by the polymerisation of Si—H terminated organopolysiloxanes with polyether containing monomers and/or oligomers such as alkenyl terminated poly(alkylene oxide) oligomers.

The copolymer structures of silicone polyethers are
  (i) the "rake" type, where a predominately linear polyorganosiloxane provides the "backbone" of the copolymer architecture with pendant polyoxyalkylene groups forming a "rake";
  (ii) "ABA" structures are also common, where a pendant polyoxyalkylene group is at each molecular terminal of a linear polyorganosiloxane (or vice versa); and
  (iii) $(AB)_n$ silicone polyethers wherein blocks of a siloxane units and polyether units repeat to form a copolymer.

Methods for the preparation of $(AB)_n$ silicone polyether block copolymers are known, U.S. Pat. Nos. 3,957,842 and 4,022,941 by Prokai et al. teach linear siloxane-polyoxyalkylene $(AB)_n$ block copolymers having an average molecular weight of at least about 30,000. The '842 and '941 patents further teach the use of the linear siloxane-polyoxyalkylene $(AB)_n$ block copolymers in polyurethane forming compositions, as well as the cured foams and articles produced therefrom.

Other copolymers which may be prepared include silicone polyamide copolymers which have found widespread use in various commercial formulations. In particular, silicone polyamide copolymers have found utility in personal care formulations for their ability to act as a "structuring" or "gelling" agent. These are typically prepared by the polymerisation of an unsaturated (typically alkenyl) end-blocked amide with an Si—H terminated organopolysiloxane. Methods of preparation are described in, for example, WO 99/06473, U.S. Pat. No. 5,981,680 and WO200306530.

The Theological properties of uncured polymers are primarily a function of their viscosities. In general the lower the viscosity of a polymer the higher the extrusion rate of uncured compositions which contain the polymer. The viscosity of an uncured polymer is directly related to the molecular weight of the polymer and the length of the polymer chain, usually defined as the degree of polymerisation (dp). The viscosity of the uncured polymer is also a major influence on several of the physical properties of compositions incorporating the polymer such as, for example, sealant compositions, when such compositions are subsequently cured.

Compositions comprising organopolysiloxane containing polymers which cure to elastomeric solids are well known and such compositions can be produced to cure at either room temperature in the presence of moisture or with application of heat. One application for those compositions which cure at room temperature in the presence of moisture is as sealing materials. Such compositions are obtained by mixing an polydiorganosiloxane based polymer having reactive terminal groups, with a suitable silane (or siloxane) based cross-linking agent in the presence of one or more fillers and a curing catalyst. These compositions are typically either prepared in the form of one-part compositions curable upon exposure to atmospheric moisture at room temperature or two part compositions curable upon mixing under room conditions.

In use as a sealant, it is important that the composition has a blend of properties which render it capable of being applied as a paste to a joint between substrate surfaces where it can be worked, prior to curing, to provide a smooth surfaced mass which will remain in its allotted position until it has cured in to an elastomeric body adherent to the adjacent substrate surfaces. Typically sealant compositions are designed to cure quickly enough to provide a sound seal within several hours but at a speed enabling the applied material to be tooled in to a desired configuration shortly after application. The resulting cured sealant is generally formulated to have a strength and elasticity appropriate for the particular joint concerned.

The physical properties of the resulting cured composition effected include elongation and modulus at 100% elongation which are particularly important for sealants used in for example expansion joints in the construction and transportation industries, where the need for sealants with low modulus and high elongation are essential.

Hence, whilst it is known that increasing the molecular weight of a polymer would improve some physical properties of a sealant typically the maximum viscosity used in current formulations are in practice no greater than about 150000 mPa·s at 25° C. Whilst polymers having viscosities of up to 1,000,000 mPa·s at 25° C. have been discussed in the prior art the use of polymers having such viscosities has been practically unmanageable. Hence, whilst it is known increasing the molecular weight of the polymer would improve the some properties of the sealant typically the maximum viscosity used in current formulations are in practice no greater than about 150000 mPa·s at 25° C.

It has become common practice in the formulation of such compositions typically used as room temperature cure sealants, to include additives which serve to "extend" and/or "plasticise" the silicone sealant composition by blending the or each extending compound (henceforth referred to as an "extender") and/or plasticising compound (henceforth referred to as a "plasticiser") with the pre-prepared polymer and other ingredients of the composition.

An extender (sometimes also referred to as a secondary plasticiser or processing aid) is used to dilute the sealant composition and basically make the sealant more economically competitive without substantially negatively affecting the properties of the sealant formulation. The introduction of one or more extenders into a silicone sealant composition not only reduces the overall cost of the product but can also affect the properties of resulting uncured and/or cured silicone sealants. The addition of extenders can, to a degree, positively effect the rheology, adhesion and clarity properties of a silicone sealant and can cause an increase in elongation at break and a reduction in hardness of the cured product both of which can significantly enhance the lifetime of the cured sealant provided the extender is not lost from the cured sealant by, for example, evaporation or exudation.

A plasticiser (otherwise referred to as a primary plasticiser) is added to a polymer composition to provide properties within the final polymer based product to increase the flexibility and toughness of the final polymer composition. This is generally achieved by reduction of the glass transition temperature ($T_g$) of the cured polymer composition thereby generally, in the case of sealants for example, enhancing the elasticity of the sealant which in turn enables movement capabilities in a joint formed by a silicone sealant with a significant decrease in the likelihood of fracture of the bond formed between sealant and substrate when a sealant is applied thereto and cured. Plasticizers are typically used to also reduce the modulus of the sealant formulation. Plasticizers may reduce the overall unit cost of a sealant but that is not their main intended use and indeed some plasticizers are expensive and could increase the unit cost of a sealant formulation in which they are used. Plasticizers tend to be generally less volatile than extenders and are typically introduced into the polymer composition in the form of liquids or low melting point solids (which become miscible liquids during processing. Typically, for silicone based composition plasticizers are unreactive short chain siloxanes such as polydimethylsiloxane having terminal triorganosiloxy groups wherein the organic substituents are, for example, methyl, vinyl or phenyl or combinations of these groups. Such polydimethylsiloxanes normally have a viscosity of from about 5 to about 100,000 mPa·s. Compatible organic plasticizers may additionally be used, examples include dialkyl phthalates wherein the alkyl group may be linear and/or branched and contains from six to 20 carbon atoms such as dioctyl, dihexyl, dinonyl, didecyl, diallanyl and other phthalates; adipate, azelate, oleate and sebacate esters, polyols such as ethylene glycol and its derivatives, organic phosphates such as tricresyl phosphate and/or triphenyl phosphates, castor oil, tung oil, fatty acids and/or esters of fatty acids.

Extenders need to be both sufficiently compatible with the remainder of the composition and as non-volatile as possible at the temperature at which the resulting cured sealant is to be maintained (e.g. room temperature). However it has been found that whilst some proposed extenders are effective during storage, at the time of application of the sealant and at least for a time thereafter, there are several well known problems regarding their use. These include:—

(i) UV stability—the discoloring of cured sealants containing extenders upon prolonged exposure to UV light;
(ii) Poor compatibility with the polymer composition (e.g. a sealant composition) leading to their exuding from the sealant over time which negatively effects the physical and aesthetic properties and lifetime of the cured product e.g. sealant; and
(iii) Staining of the surrounding substrates onto which the extenders exude from the composition.

As previously mentioned the process used in the industry, for introducing extenders and/or plasticizers into a polymer composition such as a sealant composition, consists of merely mixing all the pre-prepared ingredients, e.g. polymer, crosslinker, catalyst, filler and the or each extender and/or plasticiser together in appropriate amounts and orders of addition. Compatibility of organic extenders and/or plasticizers with the other ingredients in a silicone based polymer composition, is a significantly greater problem than with respect to organic based polymers, silicone polymers into which the extenders and/or plasticizers are introduced tend to be highly viscous polymers, and the chemical nature of the polymer being silicone based as opposed to organic based can have significant effects on the compatibility. The level of compatibility effectively determines the amount of extender and/or plasticiser which can be introduced into a polymer composition. Typically this results in the introduction of significantly lower amounts of, in particular, extenders into the composition than may be desired because the extender will not physically mix into the polymer composition sufficiently well, particularly with the pre-formed polymer which is usually the largest component, other than the filler, in the composition. The problem of compatibility of plasticizers and extenders in silicone polymer compositions has been a known in the industry ever since the introduction of organic extenders, which as far the inventors are aware, until the present invention has not been addressed other than by the proposal of an ever increasing number of organic based extenders, each of which is physically unable to be mixed into the sealant composition at amounts of about 30% by weight of the total amount of extender and polymer.

A wide variety of organic compounds and compositions have been proposed for use as extenders for reducing the cost of the silicone sealant compositions. These materials are generally classified into two groups as high volatility extenders and low volatility extenders.

Compositions containing high volatility extenders may contain e.g. toluene or xylene. The high volatility of these compounds causes a number of disadvantages in sealant formulations including, high shrinkage (high volume loss due to evaporation of the solvent), flammability, VOC (volatile organic content), hazardous component labelling, health and safety issues, etc.

Low volatility extenders (sometimes referred to as lower molecular weight extenders), are chosen with the intention of having good compatibility with the polymers in the sealant compositions. The resulting sealants are termed "extended sealants" and generally show much more acceptable properties than diluted sealants. These solvents or lower molecular weight extenders can completely or partially replace the PDMS plasticizer in the formulation.

Low molecular weight polyisobutylenes (PIB) are proposed as extenders in DE 2364856 and DE 3217516, however, due to the limited compatibility, the maximum amount of PIB extender that can be added to an acetoxy silicone sealant formulation is typically in the 25-30% (by weight) range. A higher addition level causes the extender to bleed to the surface and makes the cured sealant surface sticky. Phosphate esters are described as potential extenders in DE 2802170 and DE 2653499.

Mineral oil fractions (e.g. isoparaffins) and polyalkylbenzenes such as heavy alkylates (alkylated aromatic materials remaining after distillation of oil in a refinery) have also been proposed as extenders. These and other organic compounds and mixtures proposed as extender materials for silicone sealant compositions are described in the following publications:—
GB2041955 describes the use of dodecyl benzene and other alkylarenes as organic extenders. GB2012789 describes the use of trioctyl phosphate for the partial replacement of PDMS. DE3342026 and DE3342027 describe the use of esters of aliphatic monocarboxylic acids as extenders. EP0043501 proposes the use of between 0.2 and 15% by weight of the sealant composition of branched and/or cyclic paraffin hydrocarbons such as cyclohexane, isohexane and isooctodecane. EP0801101 describes the use of a mixture of paraffin oils (molecular weight>180) in combination with one or more alkyl aromatic compounds. EP0842974 describes the use of alkylcyclohexanes (molecular weight>220) WO99/66012 and WO 00/27910 describe oil resistant silicone compositions containing one or more aliphatic liquid polymers and oils, petroleum derived organic oils, alkyl phosphates, polyalkylene glycol, poly(propylene oxides), hydroxyethylated alkyl phenol, dialkyldithiophosphonate, poly(isobutylenes), poly(a-olefins) and mixtures thereof as extenders.

In recent years the industry has increasingly used paraffinic hydrocarbons as extenders. EP0885921 describes the use of paraffinic hydrocarbon mixtures containing 60 to 80% paraffinic and 20 to 40% naphthenic and a maximum of 1% aromatic carbon atoms. EP0807667 appears to describe a similar extender comprising wholly or partially of a paraffin oil comprising 36-40% cyclic paraffin oils and 58 to 64% non-cyclic paraffin oils. WO99/65979 describes an oil resistant sealant composition comprising a plasticiser which may include paraffinic or naphthenic oils and mixtures thereof amongst other plasticizers. EP1481038 describes the use of a hydrocarbon fluid containing more than 60 wt. % naphthenics, at least 20 wt. % polycyclic naphthenics and an ASTM D-86 boiling point of 235-400° C. EP1252252 describes the use of an extender comprising a hydrocarbon fluid having greater than 40 parts by weight cyclic paraffinic hydrocarbons and less than 60 parts by weight monocyclic paraffinic hydrocarbons based on 100 parts by weight of hydrocarbons. EP1368426 describes a sealant composition for use with alkyd paints containing a liquid paraffinic hydrocarbon "processing aid" which preferably contains greater than 40% by weight of cyclic paraffins.

As mentioned above a fundamental problem with the use of extending materials is their lack of compatibility with components in the uncured silicone sealant composition typically resulting in phase separation during storage and exudation from the cured sealant over the complete temperature range of interest. It is commonly found that after curing extended sealants exude the extender resulting in a significant reduction in the lifetime of the cured sealant, a feature particularly prevalent with extenders having low boiling points, e.g. <100° C. Whilst it is in the interest of the manufacturer to incorporate a high loading of extender into their sealant compositions, the physical mixing of the extender material with the other ingredients as advocated in all of the above documents is prevented through the lack of compatibility particularly with respect to high viscosity polymers where the viscous properties of the polymer component are a physical barrier to the incorporation of large volumes of extender into the sealant compositions. It is generally found therefore that the amount of extender, which may be incorporated into the sealant composition, is typically between 20 and 40% by weight dependent on the extender or combination of extenders used.

Whilst many of the organic extenders proposed above have potential they all generally have problems for example whilst alkylbenzene extenders have a seemingly suitable combination of properties, i.e. high boiling points, excellent compatibility with the polydiorganosiloxane polymer matrix (resulting in cured silicone sealants of good to excellent transparency), low environmental impact, low vapour pressure (and therefore low shrinkage), positive effect on the rheological properties (reduced stringing). However, when exposed to artificial or natural weathering, alkyl benzene extended sealants tend to yellow rather rapidly. Over prolonged weathering, these extended sealants continue to yellow, and also lose their transparency. This problem does not occur with other extenders, such as phosphate esters or polyisobutylene.

Furthermore, whilst the use of polymers with very high degrees of polymerisation in siloxane formulations, can result in several advantageous properties such as high elasticity the viscosity of such polymers is generally so great (i.e. silicone gums) that they become either completely unmanageable with respect to inter-mixing with other ingredients, such as fillers, cross-linkers, extenders and/or plasticizers, or require very high shear mixers which are expensive to operate. There has therefore been a long-felt need within the industry to develop a process for the ease of introduction of silicone based polymers of very high degrees of polymerisation into compositions whilst avoiding the need for high cost equipment.

The inventors have now surprisingly developed a new process for the preparation of organopolysiloxane containing copolymers via addition reaction pathways involving the incorporation of extenders and/or plasticizers in the polymer to enable for example, the preparation of polymers of significantly greater chain length and viscosity (when in the absence of the extenders and/or plasticiser) whilst avoiding compounding problems usually encountered with polymers of such viscosities. Such diluted polymers resulting from the above may provide products comprising such polymers with new and advantageous properties in comparison with prior art materials.

In accordance with the present invention there is provided a method of making a diluted organopolysiloxane containing polymer comprising the steps of:—
i) reacting a siloxane containing material with:—
   (a) one or more organopolysiloxane polymers(s) and/or
   (b) one or more organic oligomer(s) via an addition reaction pathway in the presence of an extender and/or plasticiser, a suitable catalyst and optionally an end-blocking agent; and
ii) Where required quenching the polymerisation process;
wherein the extender and/or plasticiser is substantially retained within the resulting diluted organopolysiloxane containing polymer.

In accordance with the present invention there is provided a diluted organosiloxane containing copolymer obtainable by a method comprising the steps of:—
(i) reacting a siloxane containing material with:—
   (a) one organopolysiloxane polymer(s) and/or
   (b) one or more organic oligomer(s)
   via an addition reaction pathway in the presence of an extender and/or plasticiser, a suitable catalyst and optionally an end-blocking agent; and
(ii) where required quenching the polymerisation process;
wherein the extender and/or plasticiser is substantially retained within the resulting diluted organopolysiloxane containing polymer.

The concept of "comprising" where used herein is used in its widest sense to mean and to encompass the notions of "include" and "consist of". An organosiloxane containing polymer is intended to mean a polymer comprising multiple organopolysiloxane units per molecule and is intended to include a polymer substantially containing only organopolysiloxane groups in the polymer chain or polymers where the backbone contains both organopolysiloxane groups and e.g. organic polymeric groups in the chain. Unless otherwise indicated all viscosity values given are at a temperature of 25° C.

For the sake of clarification, the term "oligomer" and derivatives thereof are used herein to mean monomer(s) or oligomer(s) or polymer(s) utilised as a starting material involved in a polymerisation process.

An "addition polymerization" process is a polymerisation process whereby unlike in a condensation reaction no by-products such as water or alcohols are generated from the monomer co-reactants during polymerisation. A preferred addition polymerisation route is a hydrosilylation reaction between an unsaturated organic group e.g. an alkenyl or alkynyl group and an Si—H group in the presence of a suitable catalyst.

Preferably each extender and or plasticiser is miscible or at least substantially miscible with the monomeric starting materials with which they are initially mixed, and more particularly with both intermediate polymerisation reaction products and the final polymerisation product. Extenders and/or plasticizers which are "substantially miscible" are intended to include extenders and/or plasticizers are intended to include extenders and/or plasticizers which are completely or largely miscible with the monomer(s) and/or the reaction mixture during polymerisation and hence may include low melting point solids which become miscible liquids in a reaction mixture during the polymerisation process.

The siloxane containing material is preferably an organopolysiloxane monomer or oligomer which contains groups capable of undergoing addition type reactions with polymer (a) and/or oligomer (b). The preferred addition reaction involved in the addition copolymerisation in accordance with the present invention is a hydrosilylation reaction between an unsaturated group and an Si—H group but any other suitable addition type reaction may be involved.

The link between the siloxane containing material and organopolysiloxane polymer (a) or organic oligomer(b) may comprise, for the sake of example any one of the following divalent organic groups:—
—R$^6$—
—R$^6$—CO—
R$^6$—NHCO—
—R$^6$—NHCONH—R$^7$—NHCO—
—R$^6$—OOCNH—R$^7$—NHCO—
and the like, wherein R$^6$ is a divalent alkylene radical such as ethylene, propylene, butylene and the like; and R$^7$ represents a divalent alkylene group, e.g. R$^6$, or a divalent arylene group, such as a phenylene radical, i.e. —C$_6$H$_4$—. Illustrative of the other preferred examples of said divalent organic groups are; —(CH$_2$)$_2$ CO—; —(CH$_2$)$_3$ NHCO—; —(CH$_2$)$_3$ NHCONH—C$_6$H$_4$—NHCO—; —(CH$_2$)$_3$OOCNH—C$_6$H$_4$—NHCO—; and the like. Most preferably as the addition copolymerisation reaction preferred is a hydrosilylation reaction the link is in the form of a divalent alkylene group.

The nature of the reactive groups involved in the copolymerisation reaction determines the structure of the divalent organic group linking the constituents of the polymerisation reaction. Typically the reactions involved in the polymerisation of copolymers in accordance with the present invention may be as follows: — a. w CH$_2$=CHCH$_2$O(C$_n$H$_{2n}$O)$_y$CH$_2$ CH=CH$_2$+wH-SiMe$_2$-O(SiMe$_2$O)$_a$SiMe$_2$H.→—[(CH$_2$)$_3$O(C$_n$H$_{2n}$O)$_y$(CH$_2$)$_3$ SiMe$_2$-O(SiMe$_2$O)$_a$SiMe$_2$-]
b. w CH$_2$=CHO(C$_n$H$_{2n}$O)$_y$CH=CH$_2$+wHSiMe$_2$-O(SiMe$_2$O)$_a$SiMe$_2$H→—[(CH$_2$)$_2$O(C$_n$H$_{2n}$O)$_y$ (CH$_2$)$_2$ SiMe$_2$-O(SiMe$_2$O)$_a$SiMe$_2$-]w
c. w HO(C$_n$H$_2$O)$_y$ H+wOCN(CH$_2$)$_3$ SiMe$_2$-O (SiMe$_2$O)$_a$SiMe$_2$(CH$_2$)$_3$NCO→. —[(C$_n$H$_{2n}$O)$_y$OCNH (CH$_2$)$_3$SiMe$_2$-O(SiMe$_2$O)$_a$SiMe$_2$ (CH$_2$)$_3$ NHCOO]w
d. wOCNC$_6$H$_4$NHCOO(C$_n$H$_{2n}$O)$_y$CONHC$_6$H$_4$NCO+w H$_2$N(CH$_2$)$_3$SiMe$_2$-O(SiMe$_2$O)$_a$SiMe$_2$(CH$_2$)$_3$ NH2→.—[OCNHC$_6$H$_4$NHCOO(CH$_{2n}$O)$_y$CONHC$_6$H$_4$NHCONH(CH$_2$)$_3$SiMe$_2$-O(SiMe$_2$O)$_a$SiMe$_2$(CH$_2$)$_3$ NH]w
e. wOCNC$_6$H$_4$NHCOO(C$_n$H$_{2n}$O)$_y$CONHC$_6$H$_4$NCO+ wHO(CH$_2$)$_3$SiMe$_2$-O(SiMe$_2$O)$_a$SiMe$_2$(CH$_2$)$_3$ OH→.—[OCNHC$_6$H$_4$NHCOO(C$_n$H$_{2n}$O)$_y$ CONHC$_6$H$_4$NHCOO(CH$_2$)$_3$SiMe$_2$-O(SiMe$_2$O)$_a$SiMe$_2$ (CH$_2$)$_3$O]w f. wCH$_2$=CHSiPh$_2$-O(SiPh$_2$)$_y$SiPh$_2$CH=CH$_2$+wH-SiMe$_2$-O(SiMe$_2$O)$_a$SiMe$_2$H→—[—C$_2$H$_4$SiPh$_2$O (SiPh$_2$O)$_y$SiPh$_2$C$_2$H$_4$SiMe$_2$-O(SiMe$_2$O)$_a$SiMe$_2$-]w-
g. wCH$_2$=CHCH$_2$CH$_2$CH=CH$_2$ CH$_2$+wHSiMe$_2$-O (SiMe$_2$O)$_a$SiMe$_2$H→—[—(CH$_2$)$_6$SiMe$_2$O(SiMe$_2$O)$_a$ SiMe$_2$-]$_w$— wherein Me represents a methyl radical; n is an integer of from 2 to 4 inclusive; a is an integer of at least 5; y is an integer of at least 4 and w is an integer of at least 4.

Whilst the siloxane containing material may comprise any of the groups in reactions (a) to (e) above, it is preferably an organopolysiloxane monomer, more preferably in the form of a straight chain and/or branched organopolysiloxane of formula (1a)

$$R'_a SiO_{4-a/2} \qquad (1a)$$

wherein each R' may be the same or different and denotes a hydrocarbon group having from 1 to 18 carbon atoms, a substituted hydrocarbon group having from 1 to 18 carbon atoms or a hydrocarbonoxy group having up to 18 carbon atoms and a has, on average, a value of from 1 to 3, preferably 1.8 to 2.2. Preferably each R' is the same or different and are exemplified by, but not limited to hydrogen, alkyl groups such as methyl, ethyl, propyl, butyl, pentyl, hexyl, heptyl, octyl, undecyl, and octadecyl; cycloalkyl such as cyclohexyl; aryl such as phenyl, tolyl, xylyl, benzyl, and 2-phenylethyl; and halogenated hydrocarbon groups such as 3,3,3-trifluoropropyl, 3-chloropropyl, and dichlorophenyl. Some R' groups may be hydrogen groups. Preferably the polydiorganosiloxanes are polydialkylsiloxanes, most preferably polydimethylsiloxanes. When the siloxane containing material is an Organopolysiloxane monomer, said organopolysiloxane monomer must have at least one groups which is reactable with at least two groups, typically the terminal groups, of polymer (a) and/or oligomer (b) via an addition reaction process. Preferably when the siloxane containing material is an organopolysiloxane said organopolysiloxane comprises at least one Si—H per molecule, preferably at least two Si—H groups per molecule. Preferably when the siloxane containing material is an organopolysiloxane said organopolysiloxane is end-blocked with a silyl group of the formula H(alkyl)$_2$Si—, and each alkyl group may be the same or different and is preferably methyl or ethyl. Preferably when the siloxane containing material is an organopolysiloxane said organopolysiloxane has a viscosity of between 10 mPa·s and 5000 mPa·s at 25° C.

In cases where the siloxane containing material comprises only one addition reactable group and polymer (a) and/or oligomer (b) comprises two addition reactable groups which will react with the siloxane containing material, the resulting product will be an "ABA" type polymeric product. Whereas when both the siloxane containing material comprises only one addition reactable group and polymer (a) and/or oligomer (b) comprises two addition reactable groups which will react with the siloxane containing material interaction between the two components would lead to (AB)n block copolymers in which the length of the polymer is largely determined by the relative amounts of the two constituents.

Organopolysiloxane polymer (a) is preferably a straight chain and/or branched organopolysiloxane of formula (1b)

$$R'''_a SiO_{4-a/2} \qquad (1b)$$

wherein each R''' may be the same or different and denotes a hydrocarbon group having from 1 to 18 carbon atoms, a substituted hydrocarbon group having from 1 to 18 carbon atoms or a hydrocarbonoxy group having up to 18 carbon atoms and a has, on average, a value of from 1 to 3, preferably 1.8 to 2.2. Preferably no R''' groups may be hydrogen groups. Preferably each R''' is the same or different and are exemplified by, but not limited to alkyl groups such as methyl, ethyl, propyl, butyl, pentyl, hexyl, heptyl, octyl, undecyl, and octadecyl; cycloalkyl such as cyclohexyl; aryl such as phenyl, tolyl, xylyl, benzyl, and 2-phenylethyl; and halogenated hydrocarbon groups such as 3,3,3-trifluoropropyl, 3-chloropropyl, and dichlorophenyl.

Organopolysiloxane polymer (a) may comprise any suitable organopolysiloxane polymeric backbone but is preferably linear or branched, and comprises at least one, preferably at least two substituent groups which will react with the aforementioned groups in the siloxane containing material via an addition reaction pathway. Preferably the or each substituent group of polymer (a) is a terminal group. When the siloxane containing material comprises at least one Si—H group, the preferred substituent groups on organopolysiloxane polymer (a), which are designed to interact with the Si—H groups, are preferably unsaturated groups (e.g. alkenyl terminated e.g. ethenyl terminated, propenyl terminated, allyl terminated (CH$_2$=CHCH$_2$—)) or terminated with acrylic or alkylacrylic such as CH$_2$=C(CH$_3$)—CH$_2$— groups Representative, non-limiting examples of the alkenyl groups are shown by the following structures; H$_2$C=CH—, H$_2$C=CHCH$_2$—, H$_2$C=C(CH$_3$)CH$_2$—, H$_2$C=CHCH$_2$CH$_2$—, H$_2$C=CHCH$_2$CH$_2$CH$_2$—, and H$_2$C=CHCH$_2$CH$_2$CH$_2$CH$_2$—. Representative, non-limiting examples of alkynyl groups are shown by the following structures; HC≡C—, HC≡CCH$_2$—, HC≡CC(CH$_3$)—, HC≡CC(CH$_3$)$_2$—, HC≡CC(CH$_3$)$_2$CH$_2$— Alternatively, the unsaturated organic group can be an organofunctional hydrocarbon such as an acrylate, methacrylate and the like such as alkenyl an/or alkynyl groups. Alkenyl groups are particularly preferred.

The organic oligomer (b) as hereinbefore described may comprise any suitable organic based monomer, oligomer and/or polymer suitable as a constituent of the addition polymerisation polymer backbone. For example the organic oligomer (b) may comprise, for example, polystyrene and/or substituted polystyrenes such as poly(α-methylstyrene), poly(vinylmethylstyrene), poly(p-trimethylsilylstyrene) linear and or branched a Ω dienes (which may be optionally substituted, examples include 1,5-hexadiene and 1,7-octadiene and poly (p-trimethylsilyl-α-methylstyrene). In each case the oligomers used for organic oligomer (b) comprise at least two substituent groups which will react with the reactive groups of the siloxane containing material. Typically the organic oligomer (b) comprises at least two unsaturated terminal groups, preferably alkenyl terminal groups available for interaction with e.g. Si—H groups of the siloxane containing material. Other organic based oligomers (b) may include acetylene terminated oligophenylenes, vinylbenzyl terminated aromatic polysulphones oligomers. Further organic polymeric backbones suitable as oligomer (b) include aromatic polyester based monomers and aromatic polyester based monomers, both preferably comprising alkenyl terminal groups.

Perhaps the most preferred oligomer (b) are polyoxyalkylene based polymers having unsaturated (e.g. alkenyl) terminal groups. Such polyoxyalkylene polymers preferably comprise a linear predominantly oxyalkylene polymer comprised of recurring oxyalkylene units, (—C$_n$H$_{2n}$—O—) illustrated by the average formula (—C$_n$H$_{2n}$—O—)$_y$ wherein n is an integer from 2 to 4 inclusive and y is an integer of at least four. The average molecular weight of each polyoxyalkylene polymer (b) may range from about 300 to about 10,000. Moreover, the oxyalkylene units are not necessarily identical throughout the polyoxyalkylene monomer, but can differ from unit to unit. A polyoxyalkylene block, for example, can be comprised of oxyethylene units, (—C$_2$H$_4$—O—); oxypropylene units (—C$_3$H$_6$—O—); or oxybutylene units, (—C$_4$H$_8$—O—); or mixtures thereof.

Other polyoxyalkylene monomers suitable for use as oligomer (b) may include for example:—

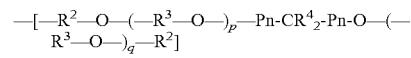

in which Pn is a 1,4-phenylene group, each R$^2$ is, independently from the other, a divalent hydrocarbon group having 2 to 8 carbon atoms, each R$^3$ is, independently from the others, an ethylene group or propylene group, each R$^4$ is, independently from the other, a hydrogen atom or methyl group and each of the subscripts p and q is a positive integer in the range from 3 to 30.

The linear copolymer formed by the polymerisation of siloxane containing material in combination with oligomer (b) when oligomer (b) is a polyoxyalkylene can be represented by the average formula

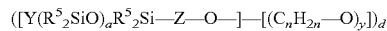

wherein R$^5$ represents a monovalent hydrocarbon radical free from aliphatic unsaturation, n is an integer, preferably from 2 to 4 inclusive; a is an integer which is preferably at least 6; y is an integer, preferably of at least 4; d is an integer of at least 4; Z represents a divalent organic group attached to the adjacent silicon atom by a carbon to silicon bond and to the polyoxyalkylene block by an oxygen atom; the average molecular weight of each siloxane block being from about 500 to about 10,000; the average molecular weight of each polyoxyalkylene block being from about 300 to about 10,000; said siloxane blocks constituting from about 20 to about 50 weight percent of the copolymer; the polyoxyalkylene blocks constituting about 80 to about 50 weight percent of the copolymer; and the block copolymer having an average molecular weight of at least about 30,000. Of course it is understood that the chosen values of R$^5$, n, a, y and d must be such, that in any given block copolymer as defined herein, they coincide with the particular average weight values of the siloxane blocks, the polyoxyalkylene blocks and the copolymer itself.

The linkage between the two different copolymeric blocks resulting from the addition copolymerisation reaction in accordance with the present invention are generally non-hydrolysable, comprising a divalent organic group attached to the adjacent silicon atom by a carbon to silicon bond and when (b) is a polyoxyalkylene, to the polyoxyalkylene block by an oxygen atom. Such linkages are readily apparent and determined by the reaction employed to produce the e.g. siloxane-polyoxyalkylene block copolymer. Moreover, these linear (AB)n block copolymers are also end-blocked, generally with the residual reactive groups of the reactants used to produce the linear block (AB)n copolymers unless end-blockers are introduced into the reaction mixture Hence linear non-hydrolyzable (AB)n block copolymers in accordance with the present invention of this invention can be prepared by platinum catalyzed hydrosilation of alkenyl terminated polyethers with SiH-terminated dialkylsiloxane fluids. The resulting copolymer being a combination of polyoxyalkylene blocks linked through silicon to carbon to oxygen linkages (i.e. a propyleneoxy group) and the end-blocking groups being selected from the group consisting of allyl, propenyl and/or hydrogen (dialkyl) siloxy groups (dependent on the relative amounts of the constituents which are present).

This preferred method for preparing non-hydrolyzable linear (AB)n silicone-polyoxyalkylene block copolymers having average molecular weights ranging from at least about 30,000 involves the platinum catalyzed hydrosilation of allyl terminated polyethers with SiH-terminated dihydrocarbyl siloxane fluids. Of course it is understood that the reactants are preferably in as pure as form as possible and that the general process requires equimolar quantities or as near to this as possible, since deviations from the 1:1 stoichiometry will not yield as high a molecular weight block copolymer as desired. However, when allyl terminated polyalkylene compounds are used an excess of said allyl compound may be desirable to allow for isomerization of the allyl group to propenyl.

The linear siloxane-polyoxyalkylene block copolymers can have an average molecular weight of about 30,000 on up to about 250,000 or higher. The upper limit is not critical, its value merely being dependent upon the practicalities of process limitations in preparing such high molecular weight (AB)n type polymers. The siloxane blocks of said block copolymers can constitute about 20 to about 50 weight percent of the block copolymer, while the polyoxyalkylene blocks can constitute about 80 to about 50 weight percent of the block copolymer. Preferably the non-hydrolyzable type (AB)n polymers in accordance with the present invention have a number average molecular weight of at least about 30,000.

Preferably the polymer produced in accordance with the present invention has an average number molecular weight (Mn) greater than 132,000 and a degree of polymerisation of greater than 1800 as determined by ASTM D5296-05 with the weight values being determined in terms of polystyrene molecular weight equivalents.

It is to be understood that while said (AB)n block copolymers of this invention can be discrete chemical compounds they are usually mixtures of various discrete block copolymers species due at least in part to the fact that the siloxane and polyoxyalkylene reactants used to produce said (AB)n block copolymers are themselves usually mixtures.

In carrying out the process it is generally preferred to mix all of the ingredients including the extender and/or plasticiser together at about room temperature (25° C.) and allow the reaction to proceed at elevated temperatures, preferably about 60° C. to about 150° C. Lower or higher temperatures up to 200° C. may be employed depending on the extender and/or plasticiser being used, but there normally is no advantage. Likewise the reaction is generally conducted at atmospheric pressures, although other pressures could be used if desired. The removal or neutralization of the platinum catalyst, e.g. chloroplatinic acid is desirable and can be accomplished in any conventional manner.

Of course as is readily apparent to those skilled in the art the choice of the particular hydrogen terminated siloxane polymer and allyl terminated polyoxyalkylene diol reactant merely depends on the particular block copolymer desired. Moreover the final molecular weight of the block copolymer product is also a function of reaction time and temperature. Thus those skilled in the art will readily recognize that it is obvious that an extremely large number and variety of block copolymers can be predetermined and selectively prepared by routine experimentation, which permits tailoring the compositions and products made therefrom to individual specifications and needs rather than vice versa.

The silicone block copolymer in accordance with the present invention may alternatively having at least one repeating polyether-amide unit represented by the formula

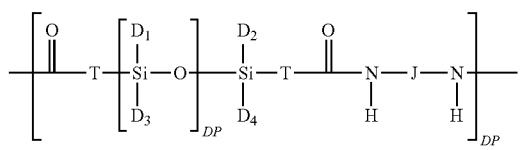

wherein
T is a linear or branched $C_1$-$C_{30}$ alkylene chain;
J is a divalent organic group containing at least one polyoxyalkylene group having the formula —$(C_aH_{2a}O)_b$— or one polyalkylene group having the formula —$(C_aH_{2a})_b$—,
where a is 2 to 4 inclusive, b is 1 to 700,
$D^1$ to $D^4$ are independently a monovalent organic group;
Each DP is independently an integer having a value of 1-500;
and n is an integer having a value of 1-500.

The viscosity of the organopolysiloxanes which may be produced by the process using a catalyst according to the present invention may be in the range of from 1000 to many millions mPa·s at 25° C., depending on the reaction conditions and raw materials used in the method of the invention.

The process according to the invention can be used to make a whole range of organopolysiloxane containing polymers, including liquid siloxane polymers and gums of high molecular weight, for example from $1 \times 10^4$ to $100 \times 10^9$ mPa·s. The molecular weight of silicone polymers is effected by the concentration of end groups, stoichiometry of the reagents. The catalyst used in the present invention has sufficient activity to enable the formation of polymers in a reasonable time at a low catalyst concentration.

When the addition reaction chosen is a hydrosilylation reaction, any suitable hydrosilylation catalyst may be utilised. Such hydrosilylation catalysts are illustrated by any metal-containing catalyst which facilitates the reaction of silicon-bonded hydrogen atoms of the SiH terminated organopolysiloxane with the unsaturated hydrocarbon group on the polyoxyethylene. The metals are illustrated by ruthenium, rhodium, palladium, osmium, iridium, or platinum.

Hydrosilylation catalysts are illustrated by the following; chloroplatinic acid, alcohol modified chloroplatinic acids, olefin complexes of chloroplatinic acid, complexes of chloroplatinic acid and divinyltetramethyldisiloxane, fine platinum particles adsorbed on carbon carriers, platinum supported on metal oxide carriers such as $Pt(Al_2O_3)$, platinum black, platinum acetylacetonate, platinum(divinyltetramethyldisiloxane), platinous halides exemplified by $PtCl_2$, $PtCl_4$, $Pt(CN)_2$, complexes of platinous halides with unsaturated compounds exemplified by ethylene, propylene, and organovinylsiloxanes, styrene hexamethyldiplatinum, Such noble metal catalysts are described in U.S. Pat. No. 3,923,705, incorporated herein by reference to show platinum catalysts. One preferred platinum catalyst is Karstedt's catalyst, which is described in Karstedt's U.S. Pat. Nos. 3,715,334 and 3,814,730, incorporated herein by reference. Karstedt's catalyst is a platinum divinyl tetramethyl disiloxane complex typically containing one weight percent of platinum in a solvent such as toluene. Another preferred platinum catalyst is a reaction product of chloroplatinic acid and an organosilicon compound containing terminal aliphatic unsaturation. It is described in U.S. Pat. No. 3,419,593, incorporated herein by reference. Most preferred as the catalyst is a neutralized complex of platinous chloride and divinyl tetramethyl disiloxane, for example as described in U.S. Pat. No. 5,175,325.

Ruthenium catalysts such as $RhCl_3(Bu_2S)_3$ and ruthenium carbonyl compounds such as ruthenium 1,1,1-trifluoroacetylacetonate, ruthenium acetylacetonate and triruthinium dodecacarbonyl or a ruthenium 1,3-ketoenolate may alternatively be used.

Other hydrosilylation catalysts suitable for use in the present invention include for example rhodium catalysts such as $[Rh(O_2CCH_3)_2]_2$, $Rh(O_2CCH_3)_3$, $Rh_2(C_8H_{15}O_2)_4$, $Rh(C_5H_7O_2)_3$, $Rh(C_5H_7O_2)(CO)_2$, $Rh(CO)[Ph_3P](C_5H_7O_2)$, $RhX^4{}_3[(R^3)_2S]_3$, $(R^2{}_3P)_2Rh(CO)X^4$, $(R^2{}_3P)_2Rh(CO)H$, $Rh_2X^4{}_2Y^4{}_4$, $H_aRh_b\text{olefin}_cCl_d$, $Rh(O(CO)R^3)_{3-n}(OH)_n$ where $X^4$ is hydrogen, chlorine, bromine or iodine, $Y^4$ is an alkyl group, such as methyl or ethyl, $CO$, $C_8H_{14}$ or $0.5\, C_8H_{12}$, $R^3$ is an alkyl radical, cycloalkyl radical or aryl radical and $R^2$ is an alkyl radical an aryl radical or an oxygen substituted radical, a is 0 or 1, b is 1 or 2, c is a whole number from 1 to 4 inclusive and d is 2, 3 or 4, n is 0 or 1. Any suitable iridium catalysts such as $Ir(OOCCH_3)_3$, $Ir(C_5H_7O_2)_3$, $[Ir(Z^2)(En)_2]_2$, or $(Ir(Z^2)(Dien)]_2$, where $Z^2$ is chlorine, bromine, iodine, or alkoxy, En is an olefin and Dien is cyclooctadiene may also be used.

Additional components can be added to the hydrosilylation reaction which are known to enhance such reactions. These components include salts such as sodium acetate which have a buffering effect in combination with platinum catalysts.

The amount of hydrosilylation catalyst that is used is not narrowly limited as long as there is a sufficient amount to accelerate a reaction between the polyoxyethylene having an unsaturated hydrocarbon group at each molecular terminal and the SiH terminated organopolysiloxane at room temperature or at temperatures above room temperature. The exact necessary amount of this catalyst will depend on the particular catalyst utilized and is not easily predictable. However, for platinum-containing catalysts the amount can be as low as one weight part of platinum for every one million weight parts of components the polyoxyethylene having an unsaturated hydrocarbon group at each molecular terminal and the SiH terminated organopolysiloxane. The catalyst can be added at an amount 10 to 120 weight parts per one million parts of components the polyoxyethylene having an unsaturated organic group at each molecular terminal and the SiH terminated organopolysiloxane, but is typically added in an amount from 10 to 60 weight parts per one million parts of the polyoxyethylene having an unsaturated organic group at each molecular terminal and the SiH terminated organopolysiloxane.

When the siloxane containing material is an organopolysiloxane having at least two Si—H groups, typically, the process is carried out using approximately a 1:1 molar ratio of ≡Si—H containing polysiloxane and the material containing unsaturation. It is expected that useful materials may also be prepared by carrying out the process with an excess of either the ≡Si—H containing polysiloxane or the material containing unsaturation, but this would be considered a less efficient use of the materials. Typically, the material containing the unsaturation is used in slight excess to ensure all the SiH is consumed in the reaction.

The general method may be carried out in either batch or continuous modes of operation. Heat and/or vacuum may be applied to achieve desired kinetics and/or influence the chemical equilibrium.

Preferably the or each extender and/or plasticiser used in accordance with the present invention are not intended to chemically bond to the siloxane containing material or polymer (a) and/or oligomer (b) starting materials or intermediate or final polymerisation product. However, some chemical bonding and/or reversible interactions between the polymer reaction products and extender(s) and/or plasticiser(s) may occur. Preferably, chemical bonding, which takes place between the polymer and the extender(s) and/or plasticiser(s) occurs with substituents along the backbone of the polymer rather than with polymer end groups so as to form a cross-linking network between polymer and extender and/or plasticiser thereby providing a polymer product which is less likely to result in extender and/or plasticiser loss and/or shrinkage when used in for example a sealant composition. For the sake of clarification with respect to this paragraph the term "chemically bond" is intended to mean the formation of covalent or the like bonds and not mere chemical interactions such as hydrogen bonding or the like.

Any suitable extenders and/or plasticiser or combination of extenders and/or plasticizers may be utilised.

These include each of the following alone or in combination with others from the list:—trialkylsilyl terminated polydialkyl siloxane where the alkyl groups are preferably methyl groups, where each alkyl group may be the same or different and comprises from 1 to 6 carbon atoms but is preferably a methyl group, preferably with a viscosity of from 100 to 100000 mPa·s at 25° C. and most preferably from 1000 to 60000 mPa·s at 25° C.;

polyisobutylenes (PIB), phosphate esters such as trioctyl phosphate polyalkylbenzenes, linear and/or branched alkylbenzenes such as heavy alkylates, dodecyl benzene and other alkylarenes, esters of aliphatic monocarboxylic acids;

dialkyl phthalates wherein the alkyl group may be linear and/or branched and contains from six to 20 carbon atoms such as dioctyl, dihexyl, dinonyl, didecyl, diallanyl and other phthalates;

adipate, azelate, oleate and sebacate esters, tung oil, fatty acids and/or esters of fatty acids.

polyols such as ethylene glycol and its derivatives, organic phosphates such as tricresyl phosphate and/or triphenyl phosphates and/or castor oil.

linear or branched mono unsaturated hydrocarbons such as linear or branched alkenes or mixtures thereof containing from 12 to 25 carbon atoms; and/or Preferably extender (c) may comprise any suitable mineral oil, examples include linear or branched mono unsaturated hydrocarbons such as linear or branched alkenes or mixtures thereof containing at least 12, e.g. from 12 to 25 carbon atoms; and/or mineral oil fractions comprising linear (e.g. n-paraffinic) mineral oils, branched (iso-paraffinic) mineral oils, cyclic (referred in some prior art as naphthenic) mineral oils and mixtures thereof. Preferably the hydrocarbons utilised comprise at least 10, preferably at least 12 and most preferably greater than 20 carbon atoms per molecule.

Other preferred mineral oil extenders include alkylcycloaliphatic compounds and alkylbenzenes including polyalkylbenzenes.

Any suitable mixture of mineral oil fractions may be utilised as the extender in the present invention but high molecular weight extenders (e.g. >220) are particularly preferred. Examples include:— alkylcyclohexanes (molecular weight>220);

paraffinic hydrocarbons and mixtures thereof containing from 1 to 99%, preferably from 15 to 80% n-paraffinic and/or isoparaffinic hydrocarbons (linear branched paraffinic) and 1 to 99%, preferably 85 to 20% cyclic hydrocarbons (naphthenic) and a maximum of 3%, preferably a maximum of 1% aromatic carbon atoms. The cyclic paraffinic hydrocarbons (naphthenics) may contain cyclic and/or polycyclic hydrocarbons. Any suitable mixture of mineral oil fractions may be used, e.g. mixtures containing (i) 60 to 80% paraffinic and 20 to 40% naphthenic and a maximum of 1% aromatic carbon atoms;
(ii) 30-50%, preferably 35 to 45% naphthenic and 70 to 50% paraffinic and or isoparaffinic oils;
(iii) hydrocarbon fluids containing more than 60 wt. % naphthenics, at least 20 wt. % polycyclic naphthenics and an ASTM D-86 boiling point of greater than 235° C.;
(iv) hydrocarbon fluid having greater than 40 parts by weight naphthenic hydrocarbons and less than 60 parts by weight paraffinic and/or isoparaffinic hydrocarbons based on 100 parts by weight of hydrocarbons.

Preferably the mineral oil based extender or mixture thereof comprises at least one of the following parameters:—
(i) a molecular weight of greater than 150, most preferably greater than 200;
(ii) an initial boiling point equal to or greater than 230° C. (according to ASTM D 86).
(iii) a viscosity density constant value of less than or equal to 0.9; (according to ASTM 2501)
(iv) an average of at least 12 carbon atoms per molecule, most preferably 12 to 30 carbon atoms per molecule;
(v) an aniline point equal to or greater than 70° C., most preferably the aniline point is from 80 to 110° C. (according to ASTM D 611);
(vi) a naphthenic content of from 20 to 70% by weight of the extender and a mineral oil based extender has a paraffinic content of from 30 to 80% by weight of the extender according to ASTM D 3238);
(vii) a pour point of from −50 to 60° C. (according to ASTM D 97);
(viii) a kinematic viscosity of from 1 to 20 cSt at 40° C. (according to ASTM D 445)
(ix) a specific gravity of from 0.7 to 1.1 (according to ASTM D1298);
(x) a refractive index of from 1.1 to 1.8 at 20° C. (according to ASTM D 1218)
(xi) a density at 15° C. of greater than 700 kg/m³ (according to ASTM D4052) and/or
(xii) a flash point of greater than 100° C., more preferably greater than 110° C. (according to ASTM D 93)
(xiii) a saybolt colour of at least +30 (according to ASTM D 156)
(xiv) a water content of less than or equal to 250 ppm
(xv) a Sulphur content of less than 2.5 ppm (according to ASTM D 4927)

The alkylbenzene compounds suitable for use include heavy alkylate alkylbenzene or an alkylcycloaliphatic compound. Examples of alkyl substituted aryl compounds useful as extenders and/or plasticizers are compounds which have aryl groups, especially benzene substituted by alkyl and possibly other substituents, and a molecular weight of at least 200. Examples of such extenders as described in U.S. Pat. No. 4,312,801, the content of which is incorporated herein by reference. These compounds can be represented by general formula (V), (VI), (VII) and (VIII)

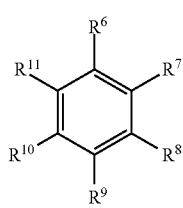

(V)

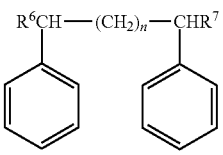

(VI)

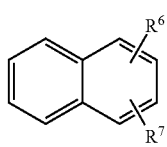

(VII)

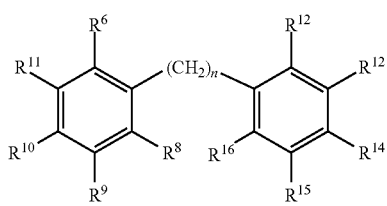

(VIII)

where $R^6$ is an alkyl chain of from 1 to 30 carbon atoms, each of $R^7$ through to $R^{16}$ is independently selected from hydrogen, alkyl, alkenyl, alkynyl, halogen, haloalkyl, nitrile, amine, amide, an ether such as an alkyl ether or an ester such as an alkyl ester group, and n is an integer of from 1 to 25.

In particular, the extender used in accordance with the process of the present invention is of formula (VI) where each of $R^7$, $R^8$, $R^9$, $R^{10}$ and $R^{11}$ is hydrogen and $R^6$ is a $C_{10}$-$C_{13}$ alkyl group. A particularly useful source of such compounds are the so-called "heavy alkylates", which are recoverable from oil refineries after oil distillation. Generally distillation takes place at temperatures in the range of from 230-330° C., and the heavy alkylates are present in the fraction remaining after the lighter fractions have been distilled off.

Examples of alkylcycloaliphatic compounds are substituted cyclohexanes with a molecular weight in excess of 220. Examples of such compounds are described in EP 0842974, the content of which is incorporated herein by reference. Such compounds may be represented by general formula (IX).

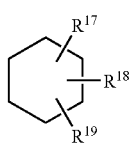

(IX)

where $R^{17}$ is a straight or branched alkyl group of from 1 to 25 carbon atoms, and $R^{18}$ and $R^{19}$ are independently selected from hydrogen or a $C_{1-25}$ straight or branched chain alkyl group.

Where appropriate polyester based plasticizers such as polyesters of dibasic acids and dihydric alcohols may be utilised, the examples of dibasic acids being phthalic acid, isophthalic acid, terephthalic acid, tetrahydrophthalic acid, polybutadiene dicarboxylic acid, oxalic acid, malonic acid, succinic acid, sebacic acid, maleic acid, fumaric acid, and cyclopentadiene dicarboxylic acid and the examples of dihydric alcohols being ethylene glycol, propylene glycol, butane diol, hexamethylene glycol, hydrogenated bisphenol A, neopoentyl glycol, polybutadiene diol, diethylene glycol, triethylene glycol and dipropylene glycol; polyethers such as polyoxyethylene, polyoxypropylene, polyoxyethyleneoxypropylene, polyoxytetramethylene, polyoxytetramethyleneoxypropylene and polyepichlorohydrin; polystyrenes such as poly-alpha-methylstyrene and polystyrene; polybutadiene; butadiene-acrylonitrile copolymer; polychloroprene; polyisoprene; polybutene and chlorinated paraffins. Among these compounds, polyesters, polyethers, polystyrenes, polybutadiene and polybutene are preferred from the viewpoints of miscibility and viscosity.

The amount of extender and/or plasticiser which may be included in the composition will depend upon factors such as the purpose to which the composition is to be put, the molecular weight of the extender(s) and/or plasticiser(s) concerned etc. Polymer products in accordance with the present invention may contain from 5% w/w up to 70% w/w extender and/or plasticiser (based on the combined weight of polymer and extender(s) and/or plasticiser(s)) depending upon these factors. In general however, the higher the molecular weight of the extender(s) and/or plasticiser(s), the less will be tolerated in the composition. Typical compositions will contain up to 70% w/w extender(s) and/or plasticiser(s). More suitable polymer products comprise from 30-60% w/w of a linear extender(s) and/or plasticiser(s) whereas 25-35% w/w will be more preferred when the extender and/or plasticiser is a heavy alkylate.

One of the most important aspects of the present invention is the fact that by polymerising the polymer in the presence of the extender(s) and/or plasticiser(s) the resulting polymer/extenders and/or polymer/plasticiser mix throughout the polymerisation process has a significantly lower viscosity than would normally be expected because the viscosity reducing extender(s) and/or plasticiser(s) is present in the polymer mixture as it polymerises. It is to be understood that this is the case even when only a small amount e.g. 5-20% by weight is present for the polymerisation process in accordance with the present invention. For example using the standard process of mixing extender(s) and/or plasticiser(s) with filler and ready made polymer together one would typically only be able to incorporate approximately 28% by weight of extender(s) and/or plasticiser(s) in an 80000 mPa·s polymer because of problems with handling and blending using polymers of greater viscosity. By introducing the extender(s) and/or plasticiser(s) prior to polymerisation, blending problems are avoided and the resulting polymers may be utilised for alternative applications than are usually utilised using organopolysiloxane gums of several million mPa·s.

The process of the present invention enables a significantly greater amount of extender(s) and/or plasticiser(s) to be used, in conjunction with polymers having viscosities not previously contemplated because of handling problems. The ratio between the extender(s) and/or plasticiser(s) and the silicone phase that can be achieved is dependent on the miscibility of the extender(s) and/or plasticiser(s) in the polydimethylsiloxanes and vice versa. The miscibility was found to depend at least in part, on the molecular weight of the polydimethylsiloxanes.

This combination also provides the user with formulations comprising the diluted polymer of the present invention with a variety of improved physical characteristics, not least the elasticity of resulting products, because of the use of polymers having polymer chain length/viscosities which hitherto would not have been possible to use. Applications include, sealants formulations, coating formulations, high consistency organopolysiloxane gum formulations for high consistency rubber applications, and for dispersions thereof in volatile and non-volatile alkylsilicone fluids for use in personal care products.

Any suitable method for making the polymer in accordance with the method of the present invention may be used. The extender and/or plasticiser and catalyst may be added in any order to the monomers. Mixing is continued until the viscosity of the resulting product becomes constant or starts to decrease with time at which point the catalyst is quenched/neutralised.

Where appropriate any suitable end-blocking agent, which halts the polymerization reaction and thereby limits the average molecular weight, can be any of the end-blocking agents known to those skilled in the art. Suitable end-blocking agents include short chain (e.g. from 2 to 27 Silicon atoms) alkenyl dialkyl terminated polydimethylsiloxanes, trialkylsiloxy-terminated polydimethylsiloxanes (having from 2 to 1000 silicon atoms in the polymer backbone), disalkylsilanol terminated polydimethylsiloxanes (having from 2 to 2000 silicon atoms in the polymer backbone), or mixtures thereof, depending on the intended use of the final product.

Optionally an end-blocking agent may be used to regulate the molecular weight of the polymer and/or to add functionality. Suitable end-blocking agents include the silanes previously discussed as siloxane containing material s Functional groups introduced using end-blocking agents include alternative end groups on the polymer, e.g. silicon bonded hydrogen groups, alkenyl groups hydrolysable group such as hydroxy groups, alkoxy groups and acetoxy groups. Hydrolysable groups which may be introduced using end-blockers and where required subsequent reactions include —SiOH$_3$, —(R$^a$)SiOH$_2$, —(R$^a$)$_2$SiOH, —R$^a$Si(OR$^b$)$_2$, —Si(OR$^b$)$_3$, —R$^a{}_2$SiOR$^b$ or —R$^a{}_2$ Si —R$^c$— SiR$^d{}_p$(OR$^b$)$_{3-p}$ where each R$^a$ independently represents a monovalent hydrocarbyl group, for example, an alkyl group, in particular having from 1 to 8 carbon atoms, (and is preferably methyl); each R$^b$ and R$^d$ group is independently an alkyl or alkoxy group in which the alkyl groups suitably have up to 6 carbon atoms; R$^c$ is a divalent hydrocarbon group which may be interrupted by one or more siloxane spacers having up to six silicon atoms; and p has the value 0, 1 or 2. Water also acts as a end-blocker, with the introduction of hydroxy functional groups.

In accordance with the present invention there is provided a method of making an a moisture curable composition capable of cure to an elastomeric body comprising the steps of:—
(i) Preparing a diluted organopolysiloxane containing polymer as hereinbefore described
(ii) Introducing an end-blocker to provide at least one hydroxy or otherwise hydrolysable terminal groups
(iii) compounding the resulting diluted organopolysiloxane containing polymer with
(iv) (i) a suitable cross-linking agent which is reactive with the organopolysiloxane containing polymer,
(ii) a suitable condensation catalyst and optionally
(iii) filler.

In one embodiment the process is used to prepare a one or two part organopolysiloxane sealant composition. A two part composition comprises in the first part diluted polymer and filler (when required) and in the second part catalyst and cross-linker are provided for mixing in an appropriate ratio (e.g. 1:1 to 10:1) immediately prior to use. Additional additives to be discussed below may be provided in either part 1 or part 2 of the part composition but are preferably added in part two.

In accordance with a still further embodiment of the present invention there is provided a moisture curable composition capable of cure to an elastomeric body, the composition comprising a) A diluted organopolysiloxane having two or more silicon-bonded condensable (preferably hydroxyl or hydrolysable) groups;
b) A siloxane and/or silane cross-linker having at least two groups per molecule which are reactable with the hydroxyl or hydrolysable groups in (a);
c) Optionally one or more fillers and
d) a suitable cure catalyst Such a composition may optionally additionally include a small proportion (<20%) of a organopolysiloxane having one condensable (preferably hydroxyl or hydrolysable) end group and one unreactive end-group e.g. a trialkylsilyl end group.

Any suitable cross-linker may be used. The cross-linker used (b) in the moisture curable composition as hereinbefore described is preferably a silane compound containing hydrolysable groups. These include one or more silanes or siloxanes which contain silicon bonded hydrolysable groups such as acyloxy groups (for example, acetoxy, octanoyloxy, and benzoyloxy groups); ketoximino groups (for example dimethyl ketoximo, and isobutylketoximino); alkoxy groups (for example methoxy, ethoxy, an propoxy) and alkenyloxy groups (for example isopropenyloxy and 1-ethyl-2-methylvinyloxy).

In the case of siloxane based cross-linkers the molecular structure can be straight chained, branched, or cyclic.

The cross-linker may have two but preferably has three or four silicon-bonded condensable (preferably hydrolysable) groups per molecule. When the cross-linker is a silane and when the silane has three silicon-bonded hydrolysable groups per molecule, the fourth group is suitably a non-hydrolysable silicon-bonded organic group. These silicon-bonded organic groups are suitably hydrocarbyl groups which are optionally substituted by halogen such as fluorine and chlorine. Examples of such fourth groups include alkyl groups (for example methyl, ethyl, propyl, and butyl); cycloalkyl groups (for example cyclopentyl and cyclohexyl); alkenyl groups (for example vinyl and allyl); aryl groups (for example phenyl, and tolyl); aralkyl groups (for example 2-phenylethyl) and groups obtained by replacing all or part of the hydrogen in the preceding organic groups with halogen. Preferably however, the fourth silicon-bonded organic groups is methyl.

Silanes and siloxanes which can be used as cross-linkers include alkyltrialkoxysilanes such as methyltrimethoxysilane (MTM) and methyltriethoxysilane, alkenyltrialkoxy silanes such as vinyltrimethoxysilane and vinyltriethoxysilane, isobutyltrimethoxysilane (iBTM). Other suitable silanes include ethyltrimethoxysilane, vinyltriethoxysilane, phenyltrimethoxysilane, alkoxytrioximosilane, alkenyltrioximosilane, 3,3,3-trifluoropropyltrimethoxysilane, methyltriacetoxysilane, vinyltriacetoxysilane, ethyl triacetoxysilane, di-butoxy diacetoxysilane, phenyl-tripropionoxysilane, methyltris(methylethylketoximo)silane, vinyl-tris-methylethylketoximo)silane, methyltris(methylethylketoximino)silane, methyltris(isopropenoxy)silane, vinyltris(isopropenoxy)silane, ethylpolysilicate, n-propylorthosilicate, ethylorthosilicate, dimethyltetraacetoxydisiloxane. The cross-linker used may also comprise any combination of two or more of the above.

The amount of cross-linker present in the composition will depend upon the particular nature of the cross-linker and in particular, the molecular weight of the molecule selected. The compositions suitably contain cross-linker in at least a stoichiometric amount as compared to the polymeric material described above. Compositions may contain, for example, from 2-30% w/w of cross-linker, but generally from 2 to 10% w/w. Acetoxy cross-linkers may typically be present in amounts of from 3 to 8% w/w preferably 4 to 6% w/w whilst oximino cross-linkers, which have generally higher molecular weights will typically comprise from 3-8% w/w.

The composition further comprises a condensation catalyst. This increases the speed at which the composition cures. The catalyst chosen for inclusion in a particular silicone sealant composition depends upon the speed of cure required. Any suitable condensation catalyst may be utilised to cure the composition including tin, lead, antimony, iron, cadmium, barium, manganese, zinc, chromium, cobalt, nickel, titanium, aluminium, gallium or germanium and zirconium based catalysts such as organic tin metal catalysts and 2-ethylhexoates of iron, cobalt, manganese, lead and zinc may alternatively be used. Organotin, titanate and/or zirconate based catalysts are preferred.

Silicone sealant compositions which contain oximosilanes or acetoxysilanes generally use a tin catalyst for curing, such as triethyltin tartrate, tin octoate, tin oleate, tin naphthate, butyltintri-2-ethylhexoate, tinbutyrate, carbomethoxyphenyl tin trisuberate, isobutyltintriceroate, and diorganotin salts especially diorganotin dicarboxylate compounds such as dibutyltin dilaurate, dimethyltin dibutyrate, dibutyltin dimethoxide, dibutyltin diacetate, dimethyltin bisneodecanoate Dibutyltin dibenzoate, stannous octoate, dimethyltin dineodeconoate, dibutyltin dioctoate. Dibutyltin dilaurate, dibutyltin diacetate are particularly preferred.

For compositions which include alkoxysilane cross-linker compounds, the preferred curing catalysts are titanate or zirconate compounds. Such titanates may comprise a compound according to the general formula Ti[OR]$_4$ where each R may be the same or different and represents a monovalent, primary, secondary or tertiary aliphatic hydrocarbon group which may be linear or branched containing from 1 to 10 carbon atoms. Optionally the titanate may contain partially unsaturated groups. However, preferred examples of R include but are not restricted to methyl, ethyl, propyl, isopropyl, butyl, tertiary butyl and a branched secondary alkyl group such as 2,4-dimethyl-3-pentyl. Preferably, when each R is the same, R is an isopropyl, branched secondary alkyl group or a tertiary alkyl group, in particular, tertiary butyl. Examples include tetrabutyltitanate, tetraisopropyltitanate, or chelated titanates or zirconates. The chelation may be with any suitable chelating agent such as an alkyl acetylacetonate such as methyl or ethylacetylacetonate, suitable catalysts being. For example, diisopropyl bis(acetylacetonyl)titanate, diisopropyl bis(ethylacetoacetonyl)titanate, diisopropoxytitanium Bis (Ethylacetoacetate) and the like. Further examples of suitable catalysts are described in EP1254192 which is incorporated herein by reference. The amount of catalyst used depends on the cure system being used but typically is from 0.01 to 3% by weight of the total composition Preferably the catalyst, component (d), will be present in an amount of from about 0.1 to 3 weight % of the composition component (d) may be present in a greater amount in cases where chelating agents are used.

Compositions of this invention may contain, as optional constituents, other ingredients which are conventional to the formulation of silicone rubber sealants and the like. For example, the compositions will normally contain one or more finely divided, reinforcing fillers such as high surface area fumed and precipitated silicas including rice hull ash and to a degree calcium carbonate as discussed above, or additional non-reinforcing fillers such as crushed quartz, diatomaceous earths, barium sulphate, iron oxide, titanium dioxide and carbon black, talc, wollastonite. Other fillers which might be used alone or in addition to the above include aluminite, calcium sulphate (anhydrite), gypsum, calcium sulphate, magnesium carbonate, clays such as kaolin, aluminium trihydroxide, magnesium hydroxide (brucite), graphite, copper carbonate, e.g. malachite, nickel carbonate, e.g. zarachite, barium carbonate, e.g. witherite and/or strontium carbonate e.g. strontianite Aluminium oxide, silicates from the group consisting of olivine group; garnet group; aluminosilicates; ring silicates; chain silicates; and sheet silicates. The olivine group comprises silicate minerals, such as but not limited to, forsterite and $Mg_2SiO_4$. The garnet group comprises ground silicate minerals, such as but not limited to, pyrope; $Mg_3Al_2Si_3O_{12}$; grossular; and $Ca_2Al_2Si_3O_{12}$. Aluninosilicates comprise ground silicate minerals, such as but not limited to, sillimanite; $Al_2SiO_5$; mullite; $3Al_2O_3.2SiO_2$; kyanite; and $Al_2SiO_5$ The ring silicates group comprises silicate minerals, such as but not limited to, cordierite and $Al_3(Mg,Fe)_2[Si_4AlO_{18}]$. The chain silicates group comprises ground silicate minerals, such as but not limited to, wollastonite and $Ca[SiO_3]$.

The sheet silicates group comprises silicate minerals, such as but not limited to, mica; $K_2Al_{14}[Si_6Al_2O_{20}](OH)_4$; pyrophillite; $Al_4[Si_8O_{20}](OH)_4$; talc; $Mg_6[Si_8O_{20}](OH)_4$; serpentine for example, asbestos; Kaolinite; $Al_4[Si_4O_{10}](OH)_8$; and vermiculite.

In addition, a surface treatment of the filler(s) may be performed, for example with a fatty acid or a fatty acid ester such as a stearate, or with organosilanes, organosiloxanes, or organosilazanes hexaalkyl disilazane or short chain siloxane diols to render the filler(s) hydrophobic and therefore easier to handle and obtain a homogeneous mixture with the other sealant components The surface treatment of the fillers makes the ground silicate minerals easily wetted by the silicone polymer. These surface modified fillers do not clump, and can be homogeneously incorporated into the silicone polymer. This results in improved room temperature mechanical properties of the uncured compositions. Furthermore, the surface treated fillers give a lower conductivity than untreated or raw material.

The proportion of such fillers when employed will depend on the properties desired in the elastomer-forming composition and the cured elastomer. Usually the filler content of the composition will reside within the range from about 5 to about 800 parts by weight preferably between 25 and 400 per 100 parts by weight of the polymer excluding the extender and/or plasticiser portion.

Other ingredients which may be included in the compositions include but are not restricted to co-catalysts for accelerating the cure of the composition such as metal salts of carboxylic acids and amines; rheological modifiers; Adhesion promoters, pigments, Heat stabilizers, Flame retardants, UV stabilizers, Chain extenders, electrically and/or heat conductive fillers, Fungicides and/or biocides and the like (which may suitably by present in an amount of from 0 to 0.3% by weight) may want to increase this range there are new directions here for some other companies, water scavengers, (typically the same compounds as those used as cross-linkers or silazanes). It will be appreciated that some of the additives are included in more than one list of additives. Such additives would then have the ability to function in all the different ways referred to.

The rheological additives include silicone organic co-polymers such as those described in EP 0802233 based on polyols of polyethers or polyesters; non-ionic surfactants selected from the group consisting of polyethylene glycol, polypropylene glycol, ethoxylated castor oil, oleic acid ethoxylate, alkylphenol ethoxylates, copolymers or ethylene oxide (EO) and propylene oxide (PO), and silicone polyether copolymers; as well as silicone glycols. Some of the rheology modifiers may enhance adhesion of the elastomeric body e.g. sealant to substrates.

Any suitable adhesion promoter(s) may be incorporated in a sealant composition in accordance with the present invention. These may include for example alkoxy silanes such as aminoalkylalkoxy silanes, epoxyalkylalkoxy silanes, for example, 3-glycidoxypropyltrimethoxysilane and, mercapto-alkylalkoxy silanes and γ-aminopropyl triethoxysilane. Isocyanurates containing silicon groups such as 1,3,5-tris(trialkoxysilylalkyl) isocyanurates may additionally be used. Further suitable adhesion promoters are reaction products of epoxyalkylalkoxy silanes such as 3-glycidoxypropyltrimethoxysilane with amino-substituted alkoxysilanes such as 3-aminopropyltrimethoxysilane and optionally alkylalkoxy silanes such as methyl-trimethoxysilane. epoxyalkylalkoxy silane, mercaptoalkylalkoxy silane, and derivatives thereof.

Heat stabilizers may include Iron oxides and carbon blacks, Iron carboxylate salts, cerium hydrate, titania, barium zirconate, cerium and zirconium octoates, and porphyrins.

Flame retardants may include for example, carbon black, hydrated aluminium hydroxide, and silicates such as wollastonite, platinum and platinum compounds.

Chain extenders may include difunctional silanes which extend the length of the polysiloxane polymer chains before cross-linking occurs and, thereby, reduce the modulus of elongation of the cured elastomer. Chain extenders and cross-linkers compete in their reactions with the functional polymer ends; in order to achieve noticeable chain extension, the difunctional silane must have substantially higher reactivity than the typical trifunctional cross-linker. Suitable chain extenders for condensation cure systems are, for example, methylvinyl bis(N-methylacetamido)silane, methylhydrogendiacetoxysilane, dimethylbis(N-diethylaminoxy)silane and dimethylbis(sec.-butylamino)silane.

Electrically conductive fillers may include carbon black, metal particles such as silver particles any suitable, electrically conductive metal oxide fillers such as titanium oxide powder whose surface has been treated with tin and/or antimony, potassium titanate powder whose surface has been treated with tin and/or antimony, tin oxide whose surface has been treated with antimony, and zinc oxide whose surface has been treated with aluminium.

Thermally conductive fillers may include metal particles such as powders, flakes and colloidal silver, copper, nickel, platinum, gold aluminium and titanium, metal oxides, particularly aluminium oxide ($Al_2O_3$) and beryllium oxide (BeO); magnesium oxide, zinc oxide, zirconium oxide; Ceramic fillers such as tungsten monocarbide, silicon carbide and aluminium nitride, boron nitride and diamond.

Any suitable Fungicides and biocides may be utilised, these include N-substituted benzimidazole carbamate, benzimidazolylcarbamate such as methyl 2-benzimidazolylcarbamate, ethyl 2-benzimidazolylcarbamate, isopropyl 2-benzimidazolylcarbamate, methyl N-{2-[1-(N,N-dimethylcarbamoyl)benzimidazolyl]}carbamate, methyl N-{2-[1-(N,N-dimethylcarbamoyl)-6-methylbenzimidazolyl]}carbamate, methyl N-{2-[1-(N,N-dimethylcarbamoyl)-5-methylbenzimidazolyl]}carbamate, methyl N-{2-[1-(N-methylcarbamoyl)benzimidazolyl]}carbamate, methyl N-{2-[1-(N-methylcarbamoyl)-6-methylbenzimidazolyl]} carbamate, methyl N-{2-[1-(N-methylcarbamoyl)-5-methyl-benzimidazolyl]}carbamate, ethyl N-{2-[1-(N,N-dimethyl-carbamoyl)benzimidazolyl]}carbamate, ethyl N-{2-[2-(N-methylcarbamoyl)benzimidazolyl]}carbamate, ethyl N-{2-[1-(N,N-dimethylcarbamoyl)-6-methylbenzimidazolyl]} carbamate, ethyl N-{2-[1-(N-methylcarbamoyl)-6-methylbenzimidazolyl]}carbamate, isopropyl N-{2-[1-(N,N-dimethylcarbamoyl)benzimidazolyl]}carbamate, isopropyl N-{2-[1-(N-methylcarbamoyl)benzimidazolyl]}carbamate, methyl N-{2-[1-(N-propylcarbamoyl)benzimidazolyl]}carbamate, methyl N-{2-[1-(N-butylcarbamoyl)benzimidazolyl]}carbamate, methoxyethyl N-{2-[1-(N-propylcarbamoyl)benzimidazolyl]}carbamate, methoxyethyl N-{2-[1-(N-butylcarbamoyl)benzimidazolyl]}carbamate, ethoxyethyl N-{2-[1-(N-propylcarbamoyl)benzimidazolyl]}carbmate, ethoxyethyl N-{2-[1-(N-butylcarbamoyl)benzimidazolyl]} carbamate, methyl N-{1-(N,N-dimethylcarbamoyloxy)benzimidazolyl]}carbamate, methyl N-{2-[N-methylcarbamoyloxy)benzimidazolyl]}carbamate, methyl N-{2-[1-(N-butyl-carbamoyloxy)benzoimidazolyl]}carbamate, ethoxyethyl N-{2-[1-(N-propylcarbamoyl)benzimidazolyl]}carbamate, ethoxyethyl N-{2-[1-(N-butylcarbamoyloxy)benzoimidazolyl]}carbamate, methyl N-{2-[1-(N,N-dimethylcarbamoyl)-6-chlorobenzimidazolyl]}carbamate, and methyl N-{2-[1-(N,N-dimethylcarbamoyl)-6-nitrobenzimidazolyl]}carbamate. 10,10'-oxybisphenoxarsine (trade name: Vinyzene, OBPA), di-iodomethyl-para-tolylsulfone, benzothiophene-2-cyclohexylcarboxamide-S,S-dioxide, N-(fluordichloridemethylthio)phthalimide (trade names: Fluor-Folper, Preventol A3). Methyl-benzimideazol-2-ylcarbamate (trade names: Carbendazim, Preventol BCM), Zincbis(2-pyridylthio-1-oxide) (zinc pyrithion) 2-(4-thiazolyl)-benzimidazol, N-phenyl-iodpropargylcarbamate, N-octyl-4-isothiazolin-3-on, 4,5-dichloride-2-n-octyl-4-isothiazolin-3-on, N-butyl-1,2-benzisothiazolin-3-on and/or Triazolylcompounds, such as tebuconazol in combination with zeolites containing silver.

The compositions are preferably room temperature vulcanisable compositions in that they cure at room temperature without heating.

The compositions can be prepared by mixing the ingredients employing any suitable mixing equipment. Other components may be added as necessary. For example preferred one part, moisture curable compositions may be made by mixing together the extended polysiloxane having hydroxyl or hydrolysable groups and any organosilicon plasticizer or filler used, and mixing this with a pre-mix of the cross-linker and catalyst. UV-stabilisers pigments and other additives may be added to the mixture at any desired stage.

After mixing, the compositions may be stored under substantially anhydrous conditions, for example in sealed containers, until required for use.

Compositions according to the invention may be formulated as single part formulations which are stable in storage but cure on exposure to atmospheric moisture and may be employed in a variety of applications, for example as coating, caulking and encapsulating materials. They are, however, particularly suitable for sealing joints, cavities and other spaces in articles and structures which are subject to relative movement. They are thus particularly suitable as glazing sealants and for sealing building structures where the visual appearance of the sealant is important.

Thus in a further aspect, the invention provides a method of sealing a space between two units, said method comprising applying a composition as described above and causing or allowing the composition to cure. Suitable units include glazing structures or building units as described above and these form a further aspect of the invention.

The applicants have found that sealant formulations comprising about 5-20% by weight extender and/or plasticiser (based on the total weight of the organosiloxane polymer and extender(s) and/or plasticiser(s) provides the user with a very highly elastic sealant subsequent to curing because of the high chain length/viscosity of the polymer being used (when one considers the viscosity in the absence of the extender and/or plasticiser). Such sealants provide an elongation at break of significantly greater than 650%.

In one embodiment the process is used to prepare a one or two part organopolysiloxane sealant composition.

One particular problem which the silicone based sealant industry have had to contend with is the production of a paintable cured sealant surface. Typically this has not been possible with the vast majority of current cured silicone sealant formulations (if any in real terms). However, the applicants have found that sealant formulations comprising high levels of extenders and/or plasticizers (e.g. >45% by weight of polymer and extender(s) and/or plasticiser(s) are readily paintable because of the high proportion of organic compounds present in the formulation, which typically would not have been possible because of the mixing and compatibility problems. Tests suggest that said paintable sealant formulations are comparable if not an improvement over acrylic type fillers and because of their reduction in the amount of silicone present are of comparable price.

In an additional embodiment of the present invention there is provided a method of producing a condensation cured silicone elastomer with a surface coated with a hardened protective coating comprising, exposing a composition in accordance with process as hereinbefore described to moisture until a cured elastomeric surface is obtained and a homogeneous dull surface develops, thereafter applying a protective coating composition, hardenable at ambient conditions, over at least a portion of the cured elastomeric surface where the protective coating composition wets the surface to which it is applied and produces an essentially flaw-free film and, thereafter, allowing the protective coating composition to harden.

A further advantage of polymers made by the process of the present invention is that they contain very low levels of cyclic siloxanes after polymerisation has completed.

In a further application of the present invention the diluted polymer resulting from the polymerisation process may be dispersed in a volatile or non-volatile low molecular weight organopolysiloxane based fluid having a viscosity of between 4 and 100 mPa·s for use in personal care applications.

The volatile silicone is appropriately a low viscosity dialkylsiloxane (typically a dimethylsiloxane) fluid which preferably contains dimethylsiloxane units and optionally trimethylsiloxane units and preferably a viscosity of less than about 10 mPa·s at 25° C. The low viscosity dialkylsiloxane fluid, may be either a cyclopolysiloxane having a degree of polymerisation of from 3 to 10 or a linear siloxane compound having a degree of polymerisation of from 1 to 10, preferably between 1 and 5.

The cyclopolysiloxane compounds have been assigned the adopted name "CYCLOMETHICONE" by The Cosmetics, Toiletries and Fragrance Association, Inc., Washington, D.C. (CTFA). Both the cyclopolysiloxanes and the linear siloxanes are clear fluids, and are essentially odorless, nontoxic, nongreasy and nonstinging. Cosmetically, these volatile alkylsilicone fluids are nonirritating to skin, and exhibit enhanced spreadability and ease of rub-out when applied. Once applied, the materials evaporate leaving behind no residue.

Alkylsilicone fluids which are operable in accordance with the present invention leave substantially no residue after thirty minutes at room temperature when one gram of fluid is placed at the centre of a No. 1 circular filter paper having a diameter of 185 mm supported at its perimeter in open room atmosphere. Representative linear alkylsilicone fluids include hexamethyldisiloxane which has a boiling point of 99.5° C. and octamethyltrisiloxane which has a boiling point of 152° C. Representative cyclic alkylsilicone fluids suitable for the present application include hexamethylcyclotrisiloxane which has a boiling point of 133° C.; octamethylcyclotetrasiloxane which has a boiling point of 171° C. and decamethylcyclopentasiloxane which has a boiling point of 205° C. These alkylsilicone fluids may be used alone, or as mixtures in combinations of two or more of the individual fluids. Mixtures of the alkylsilicone fluids will result in a volatile material having an evaporating behaviour different from any one of the individual alkylsilicone fluids. The alkylsilicone fluids and their methods of preparation are known in the art, and such fluids are commercially available.

In some instances, it may be desirable to replace one or more of the methyl groups in the alkylsilicone fluid with other groups. Thus, there may be substituted groups such as alkyl radicals having two to twelve carbon atoms; aryl radicals having six to ten carbon atoms; amine groups; vinyl; hydroxy; haloalkyl groups; aralkyl groups; and acrylate groups.

Compositions in accordance with the present invention comprising a blend of the diluted polymer dispersed in the alkylsilicone fluid may additionally contain a surfactant selected from the group consisting of anionic and amphoteric surfactants. The surfactant system should provide an acceptable level of foam on the hair and be capable of cleaning the hair, and may comprise one or more water soluble detergents, i.e., an anionic or amphoteric surfactant. Suitable anionic detergents include sulfonated and sulfated alkyl, aralkyl and alkaryl anionic detergents; alkyl succinates; alkyl sulfosuccinates and N-alkyl sarcosinates. Especially preferred are the sodium, magnesium, ammonium, and the mono-, di- and triethanolamine salts of alkyl and aralkyl sulfates as well as the salts of alkaryl sulfonates. The alkyl groups of the detergents generally have a total of from about 12 to 21 carbon atoms, may be unsaturated, and are preferably fatty alkyl groups. The sulfates may be sulfate ethers containing one to ten ethylene oxide or propylene oxide units per molecule. Preferably, the sulfate ethers contain 2 to 3 ethylene oxide units.

Typical anionic detergents include, among others, sodium lauryl sulfate, sodium lauryl ether sulfate, ammonium lauryl sulfate, triethanolamine lauryl sulfate, sodium C14-16 olefin sulfonate, ammonium pareth-25 sulfate (ammonium salt of a sulfated polyethylene glycol ether of a mixture of synthetic C12-15 fatty alcohols), sodium myristyl ether sulfate, ammonium lauryl ether sulfate, disodium monooleamidosulfosuccinate, ammonium lauryl sulfosuccinate, sodium dodecylbenzene sulfonate, triethanolamine dodecylbenzene sulfonate and sodium N-lauroyl sarcosinate. The most preferred anionic detergents are the lauryl sulfates, particularly monoethanolamine, triethanolamine, ammonium and sodium lauryl sulfates. Sodium lauryl ether sulfate is also very suitable for use in the compositions in accordance with the present invention.

Surfactants generally classified as amphoteric or ampholytic detergents include, among others, cocoamphocarboxyglycinate, cocoamphocarboxypropionate, cocobetaine, N-cocamidopropyldimethylglycine, and N-lauryl-N-carboxymethyl-N-(2-hydroxyethyl)ethylenediamine. Other suitable amphoteric detergents include the quaternary cycloimidates, betaines such as alpha-(tetradecyldimethylammonio)acetate, beta-(hexadecyldiethylammonio)propionate, and gamma-(dodecyldimethylammonio)butyrate, and sultaines such as 3-(dodecyldimethylammonio)-propane-1-sulfonate, and 3-(tetradecyldimethylammonio)ethane-1-sulfonate.

The compositions of this invention may contain a nonionic surfactant. The nonionic surfactants of the present invention are selected from the group consisting of fatty acid alkanolamide and amine oxide surfactants. The fatty acid alkanolamides are nonionic surfactants obtained by reacting alkanolamines such as monoethanolamine, diethanolamine, monoisopropanolamine, or diisopropanolamine with a fatty acid or fatty acid ester to form the amide. The hydrophobic portion of the nonionic surfactant is provided by a fatty acid hydrocarbon chain which generally has from 10 to 21 carbon atoms. The fatty acid alkanolamide surfactants include, for example, fatty acid diethanolamides such as isostearic acid diethanolamide, lauric acid diethanolamide, capric acid diethanolamide, coconut fatty acid diethanolamide, linoleic acid diethanolamides, myristic acid diethanolamide, oleic acid diethanolamide, and stearic acid diethanolamide; fatty acid monoethanolamides such as coconut fatty acid monoethanolamide; and fatty acid monoisopropanolamides such as oleic acid monoisopropanolamides and lauric acid monoisopropanolamides.

The amine oxides are well known nonionic surfactants usually obtained by oxidizing a tertiary amine to form the amine oxide. They are sometimes also referred to as polar nonionic surfactants. Amine oxide surfactants include, for example, the N-alkyl amine oxides such as N-cocodimethylamine oxide, N-lauryl dimethylamine oxide, N-myristyl dimethylamine oxide, and N-stearyl dimethylamine oxide; the N-acyl amine oxides such as N-cocamidopropyl dimethylamine oxide and N-tallowamidopropyl dimethylamine oxide; and N-alkoxyalkyl amine oxides such as bis(2-hydroxyethyl) C12-15 alkoxy-propylamine oxide. The hydrophobic portion of the amine oxide surfactants is generally provided by a fatty hydrocarbon chain containing from 10 to 21 carbon atoms.

For purposes of this invention the alkanolamide and amine oxide surfactants are preferred. In general, the fatty acid diethanolamides and N-alkyl dimethylamine oxides are preferred for use in the compositions. Especially preferred are the fatty acid diethanolamides and N-alkyl dimethylamine oxides where the fatty hydrocarbon chain contains from 10 to 18 carbon atoms. For example, especially preferred nonionic surfactants include lauric acid diethanolamide, N-lauryl dimethylamine oxide, coconut acid diethanolamide, myristic acid diethanolamide, and oleic acid diethanolamide.

Additional categories of surfactant materials may also be included such as cationic and zwitterionic surfactants, and representative compounds are set forth in detail in U.S. Pat. No. 4,902,499, issued Feb. 20, 1990, which is considered to be incorporated herein by reference.

Other adjuvants may be added to compositions in accordance with the present invention comprising a blend of the diluted polymer dispersed in the alkylsilicone fluid include for example thickeners, perfumes, colorants, electrolytes, pH control ingredients, foam boosters and foam stabilizers, antimicrobials, antioxidants, ultraviolet light absorbers and medicaments. For example, it is sometimes preferred to employ a thickener in the compositions to facilitate the hand application of the composition to the hair. Thickeners are preferably used in sufficient quantities to provide a more luxurious effect. For example, viscosities within the range of 6,000 to 12,000 mPa·s measured at 25° C. Suitable thickeners, include, among others, sodium alginate, gum arabic, polyoxyethylene, guar gum, hydroxypropyl guar gum, cellulose derivatives such as methylcellulose, methylhydroxypropylcellulose, hydroxypropylcellulose, polypropylhydroxyethylcellulose, starch and starch derivatives such as hydroxyethylamylose, and starch amylose, locust bean gum, electrolytes such as sodium or ammonium chloride, saccharides such as fructose and glucose, and derivatives of saccharides such as PEG-120 methyl glucose dioleate.

The perfumes which can be used in the compositions are cosmetically acceptable perfumes. Colorants are used to confer a color to the composition and may generally be used. Although not required, it is preferred to employ an acid to adjust the pH within the range of 5 to 9 or more preferably within the range of 6 to 8 in the compositions of this invention. Any water soluble acid such as a carboxylic acid or a mineral acid is suitable. For example, suitable acids include mineral acids such as hydrochloric, sulfuric, and phosphoric, monocarboxylic acids such as acetic acid, lactic acid, or propionic acid; and polycarboxylic acids such as succinic acid, adipic acid and citric acid.

If for special purposes additional conditioners are desired, they may be added. For example, any of the well-known organic cationic hair conditioning components may be added. Some cationic conditioning components that may be used in the present invention to provide hair grooming include quaternary nitrogen derivatives of cellulose ethers, homopolymers of dimethyldiallyl-ammonium chloride, copolymers of acrylamide and dimethyldiallylammonium chloride, homopolymers or copolymers derived from acrylic acid or methacrylic acid containing cationic nitrogen functional groups attached to the polymer via ester or amide linkages, polycondensation products of N,N'-bis-(2,3-epoxypropyl)-piperazine or of piperazine-bis-acrylamide and piperazine, poly-(dimethylbutenylammonium chloride)-.alpha.,.omega.-bis-(triethanol-ammonium) chloride, and copolymers of vinylpyrrolidone and acrylic acid esters with quaternary nitrogen functionality. The above cationic organic polymers and others are described in more detail in U.S. Pat. No. 4,240,450 which is hereby incorporated by reference to further describe the cationic organic polymers. Other categories of conditioners such as monomeric quaternary amine salts may also be employed.

A preservative may be required and representative preservatives which may be employed include about 0.1-0.2 weight percent of compounds such as formaldehyde, dimethyloldimethylhydantoin, 5-bromo-5-nitro-1,3-dioxane, methyl- and propyl para-hydroxybenzoates, and mixtures of such benzoates with sodium dehydroacetate, sorbic acid, and imidazolidinyl urea.

Compositions in accordance with the present invention comprising a blend of the diluted polymer dispersed in the alkylsilicone fluid may additionally contain may also be formulated to include dyes, colorants, reducing agents, neutralizing agents, and preservatives, necessary for their application as permanent wave systems or hair dyes, for example. The active formulation can be applied in several different forms including lotions, gels, mousses, aerosols, and pump sprays, for example, and as conditioners and shampoos. The active ingredient may include a carrier, and suitable carrier fluids for hair care formulations are water as well as, for example, such fluids as alcohols namely ethanol or isopropanol, hydrocarbons and halogenated hydrocarbons as mineral spirits and trichloroethane, cyclic siloxanes, and aerosol propellants.

When the composition is intended for aerosol application, propellant gases can be included such as carbon dioxide, nitrogen, nitrous oxide, volatile hydrocarbons such as butane, isobutane, or propane and chlorinated or fluorinated hydrocarbons such as dichlorodifluoromethane and dichlorotetrafluoroethane or dimethylether.

Resulting products may be in the form of ointments, creams, gels, pastes, foams, aerosols and the like. They may be present in pharmaceutical, medical and/or therapeutic applications analgesic; anesthetic; anti-acne; antibacterial; anti-yeast; antifungal; antivirals; antidandruff; antidermatitis; antipruritic; antiemetic; anti-motion sickness; anti-inflammatory; antihyperkeratolytic; anti-dry skin; antiperspirant; antipsoriatic; antiseborrheic; hair conditioning; hair treatment; anti-aging; antiwrinkle; anti-asthmatic; bronchodilator; sunscreen; antihistamine; skin-lightening; depigmenting; wound-healing; vitamin; corticosteroid; tanning or hormonal. Products of this type are commonly used include hair care products such as shampoos, hair conditioners, hair colorants, hairstyling preparations, such as setting lotions and hairsprays and permanent wave preparations, skin care products such as facial or body powders, blushers, eyeshadows, eyeliners, bath grains or pellets, lipsticks, moisturizers, cosmetics, hand and body lotions, concealers, compact powders, foundations and sun care products such as sun screen formulations In a still further embodiment of the present invention a diluted polymer in accordance with the present invention may be incorporated into a high viscosity silicone rubber composition In a still further embodiment of the present invention a diluted polymer in accordance with the present invention may be incorporated into a high viscosity silicone rubber composition In accordance with the present invention there is provided a method of making a silicone rubber composition comprising the steps of:—

Preparing a diluted organopolysiloxane containing polymer as hereinbefore described optionally with an alkenyl group, condensable group, silyl-hydride or trimethylsilyl containing end-blocker and a siloxane based diluent; compounding the resulting diluted organopolysiloxane containing polymer with one or more reinforcing and/or non reinforcing fillers and
a curing agent.

In the present embodiment any filler or combination of fillers as hereinbefore described may be utilised. Usually the filler content of the composition will reside within the range from about 5 to about 200 parts by weight per 100 parts by weight of the polymer excluding the diluent portion.

A curing agent, as noted above, is required and compounds which can be used herein include organic peroxides such as dialkyl peroxides, diphenyl peroxides, benzoyl peroxide, 1,4-dichlorobenzoyl peroxide, 2,4-dichlorobenzoyl peroxide, di-t-butyl peroxide, dicumyl peroxide, tertiary butyl-perbenzoate, monochlorobenzoyl peroxide, ditertiary-butyl peroxide, 2,5-bis-(tertiarybutyl-peroxy)-2,5-dimethylhexane, tertiary-butyl-trimethyl peroxide, tertiary-butyl-tertiary-butyl-tertiary-triphenyl peroxide, 1,1-bis(t-butylperoxy)-3,3,5-trimethylcyclohexane, and t-butyl perbenzoate. The most suitable peroxide based curing agents are benzoyl peroxide, 2,4-dichlorobenzoyl peroxide, di-t-butyl peroxide, and dicumyl peroxide. Such organic peroxides are used at up to 10 parts per 100 parts of the combination of polymer, filler and optional additives. Preferably between 0.2 and 2 parts of peroxide are used.

The present compositions can also be cured and/or cross-linked by a hydrosilylation reaction catalyst in combination with an organohydrogensiloxane as the curing agent instead of an organic peroxide, providing a majority of polymer molecules which contain at least two unsaturated groups suitable for cross-linking with the organohydrogensiloxane. These groups are typically alkenyl groups, most preferably vinyl groups. To effect curing of the present composition, the organohydrogensiloxane must contain more than two silicon bonded hydrogen atoms per molecule. The organohydrogensiloxane can contain, for example, from about 4-20 silicon atoms per molecule, and have a viscosity of up to about 10 Pa·s at 25°C. The silicon-bonded organic groups present in the organohydrogensiloxane can include substituted and unsubstituted alkyl groups of 1-4 carbon atoms that are otherwise free of ethylenic or acetylenic unsaturation. For the purpose of this application "Substituted" means one or more hydrogen atoms in a hydrocarbon group has been replaced with another substituent. Examples of such substituents include, but are not limited to, halogen atoms such as chlorine, fluorine, bromine, and iodine; halogen atom containing groups such as chloromethyl, perfluorobutyl, trifluoroethyl, and nonafluorohexyl; oxygen atoms; oxygen atom containing groups such as (meth)acrylic and carboxyl; nitrogen atoms; nitrogen atom containing groups such as amino-functional groups, amido-functional groups, and cyano-functional groups; sulphur atoms; and sulphur atom containing groups such as mercapto groups.

Preferably the hydrosilylation catalyst may be any hydrosilylation catalyst hereinbefore described but is preferably a platinum based catalyst.

The hydrosilylation catalyst may be added to the present composition in an amount equivalent to as little as 0.001 part by weight of elemental platinum group metal, per one million parts (ppm) of the composition. Preferably, the concentration of the hydrosilylation catalyst in the composition is that capable of providing the equivalent of at least 1 part per million of elemental platinum group metal. A catalyst concentration providing the equivalent of about 3-50 parts per million of elemental platinum group metal is generally the amount preferred.

The curing agent may alternatively be a condensation reaction catalyst because the present compositions may alternatively be cured and/or cross-linked by a condensation reaction in combination with a siloxane and/or silane cross-linker having at least two and preferably at least three groups reactable with hydroxyl or hydrolysable groups provided a majority of polymer molecules contain at least two condensable groups as hereinbefore described suitable for reaction with said cross-linker.

Optional additives for a high consistency rubber composition may comprise one or more of the following rheology modifiers, pigments, colouring agents, anti-adhesive agents adhesion promoters, heat stabilisers, blowing agents, flame retardants, electrically and/or thermally conductive fillers, and desiccants, each of which are preferably as hereinbefore described.

Other optional ingredients which may be incorporated in the composition of a high consistency silicone rubber include handling agents, peroxide cure co-agents, acid acceptors, and UV stabilisers.

Handling agents are used to modify the uncured properties of the silicone rubber such as green strength or processability sold under a variety of trade names such as SILASTIC® HA-1, HA-2 and HA-3 sold by Dow Corning corporation)

Peroxide cure co-agents are used to modify the properties, such as tensile strength, elongation, hardness, compression set, rebound, adhesion and dynamic flex, of the cured rubber. These may include di- or tri-functional acrylates such as Trimethylolpropane Triacrylate and Ethylene Glycol Dimethacrylate; Triallyl Isocyanurate, Triallyl Cyanurate, Polybutadiene oligomers and the like. Silyl-hydride functional siloxanes may also be used as co-agents to modify the peroxide catalysed cure of siloxane rubbers.

The acid acceptors may include Magnesium oxide, calcium carbonate, Zinc oxide and the like.

The ceramifying agents can also be called ash stabilisers and include silicates such as wollastonite.

The silicone rubber composition in accordance with this embodiment may be made by any suitable route, for example one preferred route is to first make a silicone rubber base by heating a mixture of fumed silica, a treating agent for the silica, and the diluted organopolysiloxane containing polymer of the present invention. The silicone rubber base is removed from the first mixer and transferred to a second mixer where generally about 150 parts by weight of a non-reinforcing or extending filler such as ground quartz is added per 100 parts by weight of the silicone rubber base. Other additives are typically fed to the second mixer such as curing agents, pigments and colouring agents, heat stabilizers, anti-adhesive agents, plasticizers, and adhesion promoters. In a second preferred route the diluted organopolysiloxane containing polymer of the present invention and any desired filler plus any desired treating agent are fed into a reactor and mixed, further additives as described above including cure agents are then fed into the same reactor and further mixed.

Other potential applications of the present invention include use of the diluted organopolysiloxane containing polymer in hot melt adhesives, pressure sensitive adhesives, in encapsulants for solar cells and any other applications requiring the use of organopolysiloxane gums.

The invention will now be described by way of Example. For the sake of comparison the diluent used in both examples was a commercially available processing aid called HYDROSEAL® G250H, a hydrotreated mineral oil cut (n-para 7%/iso-para 51% and naphthenic 42%) produced by Total Fina. All viscosity measurements are measured at 25° C. unless otherwise indicated.

EXAMPLE 1

A mixture of 310 parts by weight of a dimethylvinyl silyl end-blocked polydimethylsiloxane, (Mn=12200, Viscosity~450 mPa·s) and 68 parts by weight of trimethylsilyl end-blocked polydimethylsiloxane extender (Viscosity~5,000 mPa·s was prepared and charged to a Brabender plasticorder mixer running at 20 rpm. 0.5 parts by weight of a dimethylvinyl polydimethylsiloxane—Platinum complex (0.1% Pt metal by weight) was added to the mixture and heating of the mixture to 60° C. commenced. 30 parts by weight of a dimethylhydrosilyl end-blocked polydimethylsiloxane (11 mPa·s) was added followed by a further 5.1 parts after 32 minutes at this time a rapid rise in mixer torque was observed and the viscosity of the mixture increased noticeably. A further 1.5 parts of the dimethylhydrosilyl end-blocked polydimethylsiloxane was then added, to provide an SiH end-blocked siloxane product but no further torque rise was observed. The sample was allowed to cool and analysed by gas phase chromatography (GPC). The product was found to have Mn=85000, Mw=479000.

EXAMPLE 2

Preparation of a Treated Kaolin Filled Silicone Rubber

To 100 parts by weight of the product of Example 1 was added 100 parts of a methyltrimethoxysilane treated calcined Kaolin. The mix was mixed in a Brabender plasticorder mixer at 20 rpm for 90 minutes. The product was cooled and mixed with 2 parts per hundred parts of the polymer of a paste of Dichlorobenzoyl peroxide 50 parts in silicone oil on a two roll mill and cured 5 minutes at 116° C. to give a test sheet which was tested according to the procedures indicated in Table 1.

TABLE 1

| Tensile Strength (MPa) | (ISO 37: 1994 Type 2) | 5.2 |
| Elongation at Break (%) | ISO 34: 1994 Type 2 | 218 |
| Hardness (Shore A) | (BS ISO EN 868: 2003) | 38 |
| Tear (kN/m) | (ASTM 624-98, Die B) | 14 |

Comparison of these properties with those of a typical silicone rubber (Kirk-Othmer Encyclopedia of Chemical Technology, John Wiley & Sons, Inc) shows that the above example provides a useful silicone rubber composition without the issues normally associated with the production and handling of a high molecular weight siloxane gum.

| Typical Properties of Silicone Rubbers | |
| --- | --- |
| Hardness, durometer | 25-80 |
| Tensile strength, MPa | 4.1-11.0 |
| Elongation % | 100-700 |

The invention claimed is:

1. A method of making a linear diluted organopolysiloxane containing polymer comprising the steps of:
 (i) preparing a linear organopolysiloxane containing polymer by reacting a siloxane containing material with:
  (a) one or more organopolysiloxane polymer(s) or
  (b) one or more organic oligomer(s)
  via a hydrosilylation reaction pathway in the presence of an extender and/or plasticiser which is at least substantially miscible with the oligomer and the polymer, a suitable catalyst and optionally an end-blocking agent; and
 (ii) where required quenching the polymerisation process; wherein the extender and/or plasticiser is substantially retained within the resulting linear diluted organopolysiloxane containing polymer with the proviso that the extender and/or plasticizer is not castor oil.

2. A method in accordance with claim 1 wherein the siloxane containing material is an organopolysiloxane monomer or oligomer having at least one Si—H bond.

3. A method in accordance with claim 1 characterised in that the siloxane containing material is an organopolysiloxane end-blocked with a silyl group of the formula H(alkyl)$_2$Si— having a viscosity of between 10 mPa·s and 5000 mPa·s at 25° C.

4. A method in accordance with claim 2 characterised in that the siloxane containing material is an organopolysiloxane monomer with at least one terminal group having an Si—H, which monomer is a straight chain or branched organopolysiloxane of formula $$R'_a SiO_{4-a/2} \quad (1a)$$

wherein each R' may be the same or different and denotes hydrogen, a hydrocarbon group having from 1 to 18 carbon atoms, a substituted hydrocarbon group having from 1 to 18 carbon atoms, a hydrocarbonoxy group having up to 18 carbon atoms and a has, on average, a value of from 1 to 3.

5. A method in accordance with claim 1 characterised in that the one or more organopolysiloxane polymer(s) (a) is preferably a straight chain and/or branched organopolysiloxane having at least one unsaturated terminal group, of the general formula

wherein each R''' may be the same or different and denotes a hydrocarbon group having from 1 to 18 carbon atoms, a substituted hydrocarbon group having from 1 to 18 carbon atoms or a hydrocarbonoxy group having up to 18 carbon atoms and a has, on average, a value of from 1 to 3.

6. A method in accordance with claim 5 characterised in that the at least one unsaturated group is selected from the group of $H_2C=CH—$, $H_2C=CHCH_2—$, $H_2C=C(CH_3)CH_2—$, $H_2C=CHCH_2CH_2—$, $H_2C=CHCH_2CH_2CH_2—$, $H_2C=CHCH_2CH_2CH_2CH_2$, $HC≡C—$, $HC≡CCH_2—$, $HC≡CC(CH_3)—$, $HC≡CC(CH_3)_2—$, $HC≡CC(CH_3)_2CH_2—$, an acrylate, or an alkylacrylate.

7. A method in accordance with claim 1 characterised in that the organic oligomer (b) has at least two unsaturated end groups and is selected from the group of polystyrene and/or substituted polystyrenes, linear and or branched αΩ dienes, acetylene terminated oligophenylenes, polyetheramides, vinylbenzyl terminated aromatic polysulphones, aromatic polyester based monomers and a linear predominantly oxyalkylene polymer comprised of recurring oxyalkylene units, $(—C_nH_{2n}—O—)$ where n is a whole number between 2 and 4 inclusive.

8. A method in accordance with claim 1 characterised in that the extender and/or plasticiser is selected from one or more of the group of trialkylsilyl terminated polydialkyl siloxanes, polyisobutylenes (PIB), phosphate esters polyalkylbenzenes, linear and/or branched alkylbenzenes esters of aliphatic monocarboxylic acids.

9. A method in accordance with claim 1 wherein the extender and/or plasticiser is a mineral oil or mixture thereof having at least one of the following parameters:
 (i) a molecular weight of greater than 150;
 (ii) an initial boiling point equal to or greater than 230° C. (according to ASTM D 86);
 (iii) a viscosity density constant value of less than or equal to 0.9; (according to ASTM 2501);
 (iv) an average of at least 12 carbon atoms per molecule;
 (v) an aniline point equal to or greater than 70° C. (according to ASTM D 611);
 (vi) a naphthenic content of from 20 to 70% by weight of the extender and in the case of mineral oil based extenders a paraffinic content of from 30 to 80% by weight of the extender (according to ASTM D 3238);
 (vii) a pour point of from −50 to 60° C. (according to ASTM D 97);
 (viii) a kinematic viscosity of from 1 to 20 cSt at 40° C. (according to ASTM D 445);
 (ix) a specific gravity of from 0.7 to 1.1 (according to ASTM D1298);
 (x) a refractive index of from 1.1 to 1.8 at 20° C. (according to ASTM D 1218);
 (xi) a density at 15° C. of greater than 700 kg/m$^3$ (according to ASTM D4052);
 (xii) a flash point of greater than 100° C. (according to ASTM D 93);
 (xiii) a saybolt colour of at least +30 (according to ASTM D 156);
 (xiv) a water content of less than or equal to 250 ppm;
 (xv) a Sulphur content of less than 2.5 ppm (according to ASTM D 4927).

10. A method in accordance with claim 1 characterised in that when the siloxane containing material is an organopolysiloxane, an end blocker is utilised to introduce hydroxyl, hydrolysable or amino group functionality in the linear diluted organopolysiloxane containing polymer.

11. A method in accordance with claim 10 wherein the hydrolysable group is selected from —Si(OH)$_3$, —(R$^a$)Si(OH)$_2$, —(R$^a$)$_2$SiOH, —R$^a$Si(OR$^b$)$_2$, —Si(OR$^b$)$_3$, —R$^a{}_2$SiOR$^b$ and —R$^a{}_2$Si—R$^c$—SiR$^d{}_p$(OR$^b$)$_{3-p}$ where each R$^a$ independently represents a monovalent hydrocarbyl group, each R$^b$ and R$^d$ group is independently an alkyl or alkoxy group in which the alkyl groups suitably have up to 6 carbon atoms; R$^c$ is a divalent hydrocarbon group which may be interrupted by one or more siloxane spacers having up to 6 silicon atoms; and p has the value 0, 1 or 2.

12. A method of making a moisture curable composition capable of cure to an elastomeric body comprising the steps of forming the linear diluted organopolysiloxane polymer in accordance with the method of claim 10 and mixing the linear diluted organopolysiloxane containing polymer comprising hydroxyl and or hydrolysable groups with a suitable cross-linking agent which is reactive with the organopolysiloxane containing polymer, a suitable condensation catalyst and optionally filler.

13. A method of making a moisture curable composition capable of cure to an elastomeric body in accordance with claim 12 wherein the cross-linking agent is one or more silane or siloxane which contain acyloxy groups and/or ketoximino groups, and the catalyst is a tin catalyst.

14. A method of making a moisture curable composition capable of cure to an elastomeric body in accordance with claim 12 wherein the cross-linking agent is one or more silane or siloxane which contain alkoxy groups and alkenyloxy groups and the catalyst is a titanate or zirconate or a chelated titanate or chelated zirconate.

15. A method of making a moisture curable composition capable of cure to an elastomeric body in accordance with claim 12 wherein the filler comprises one or more finely divided, reinforcing fillers selected from the group of high surface area fumed silica, precipitated silica and calcium carbonate, and/or one or more extending fillers selected from the group of crushed quartz, diatomaceous earth, barium sulphate, iron oxide, titanium dioxide, carbon black, talc, and wollastonite.

16. A moisture curable composition capable of cure to an elastomeric body, the composition comprising:
    a. a linear diluted organopolysiloxane containing polymer having not less than two silicon-bonded hydroxyl or hydrolysable groups obtained by the method of claim 11;
    b. a siloxane and/or silane cross-linker having at least two groups per molecule which are reactable with the hydroxyl or hydrolysable groups in the linear diluted organopolysiloxane;
    c. one or more fillers; and
    d. a suitable cure catalyst.

17. A moisture curable composition capable of cure to an elastomeric body, the composition formed from compounding the linear diluted organopolysiloxane polymer made in accordance with the method of claim 10 with a suitable cross-linking agent which is reactive with the organopolysiloxane polymer, a suitable condensation catalyst and optionally filler to form a one or two part organopolysiloxane sealant composition.

18. A composition comprising a linear diluted polymer formed in accordance with the method of claim 1 wherein the extender and/or plasticiser comprises a volatile or non-volatile low molecular weight organopolysiloxane based fluid having a viscosity of between 4 and 100 mPa·s at 25° C. and wherein optionally additional extender and/or plasticiser comprising said volatile or non-volatile low molecular weight organopolysiloxane based fluid having a viscosity of between 4 and 100 mPa·s at 25° C. is added to the composition subsequent to completion of polymerisation.

19. A method of making a silicone rubber composition comprising the steps of:
    preparing a linear diluted organopolysiloxane containing polymer in accordance with the method of claim 1 which polymer is end-blocked with two or more reactable groups selected from the group of alkenyl groups, condensable groups, silyl-hydride or trimethylsilyl containing end-blocker with a trialkylsilyl terminated polydialkylsiloxane extender; and
    compounding the resulting linear diluted organopolysiloxane polymer with one or more reinforcing and/or non reinforcing fillers and a curing agent; and optional additives selected from the group of one or more rheology modifiers, pigments, colouring agents, anti-adhesive agents, adhesion promoters, blowing agents, fire retardants and dessicants.

20. A method in accordance with claim 19 wherein the curing agent is one or more organic peroxides selected from the group of dialkyl peroxides, diphenyl peroxides, benzoyl peroxide, 1,4-dichlorobenzoyl peroxide, 2,4-dichlorobenzoyl peroxide, di-t-butyl peroxide, dicumyl peroxide, tertiary butyl-perbenzoate, monochlorobenzoyl peroxide, ditertiary-butyl peroxide, 2,5-bis-(tertiarybutyl-peroxy)-2,5-dimethyl-hexane, tertiary-butyl-trimethyl peroxide, tertiary-butyl-tertiary-butyl-tertiary-triphenyl peroxide, and t-butyl perbenzoate.

21. A method in accordance with claim 19 wherein the polymer comprises unsaturated groups and the curing agent is a hydrosilylation reaction catalyst in combination with an organohydrogensiloxane.

22. A method in accordance with claim 21 wherein the organohydrogensiloxane has a viscosity of up to about 10 Pa·s at 25° C.

23. A method in accordance with claim 21 wherein the hydrosilylation catalyst is a platinum group metal based catalyst selected from a platinum, rhodium, iridium, palladium or ruthenium catalyst.

24. A method in accordance with claim 19 characterised in that the polymer comprises at least two condensable groups, the curing agent is a condensation reaction catalyst and the composition is cured in combination with a siloxane and/or silane cross-linker having at least three groups reactable with hydroxyl or hydrolysable groups.

25. A method of making a linear diluted organopolysiloxane containing polymer comprising the steps of:
    (i) preparing a linear organopolysiloxane containing polymer by reacting a siloxane containing material with:
        (a) one or more organopolysiloxane polymer(s) or
        (b) one or more organic oligomer(s)
        via a hydrosilylation reaction pathway in the presence of an extender and/or plasticiser, a suitable catalyst and optionally an end-blocking agent; and
    (ii) where required quenching the polymerisation process;
        wherein the extender and/or plasticiser is substantially retained within the resulting linear diluted organopolysiloxane containing polymer with the proviso that the extender and/or plasticizer is not castor oil.

26. A method in accordance with claim 25 wherein the siloxane containing material is further defined as an organopolysiloxane monomer or oligomer having at least one Si—H bond.

27. A method in accordance with claim 25 characterised in that the siloxane containing material is further defined as an organopolysiloxane end-blocked with a silyl group of the formula H(alkyl)$_2$Si— having a viscosity of between 10 mPa·s and 5000 mPa·s at 25° C.

28. A method in accordance with claim 26 characterised in that the siloxane containing material is further defined as an organopolysiloxane monomer with at least one terminal group having an Si—H, which monomer is a straight chain or branched organopolysiloxane of formula

$$R'_a SiO_{4-a/2} \quad (1a)$$

wherein each R' may be the same or different and denotes hydrogen, a hydrocarbon group having from 1 to 18 carbon atoms, a substituted hydrocarbon group having from 1 to 18 carbon atoms, a hydrocarbonoxy group having up to 18 carbon atoms and a has, on average, a value of from 1 to 3.

29. A method in accordance with claim 25 characterised in that the (a) one or more organopolysiloxane polymer(s) is further defined as a straight chain and/or branched organopolysiloxane having at least one unsaturated terminal group, of the general formula

$$R'''_a SiO_{4-a/2}$$

wherein each R''' may be the same or different and denotes a hydrocarbon group having from 1 to 18 carbon atoms, a substituted hydrocarbon group having from 1 to 18 carbon atoms or a hydrocarbonoxy group having up to 18 carbon atoms and a has, on average, a value of from 1 to 3.

30. A method in accordance with claim 29 characterised in that the at least one unsaturated terminal group is selected from the group of H$_2$C=CH—, H$_2$C=CHCH$_2$—, H$_2$C=C(CH$_3$)CH$_2$—, H$_2$C=CHCH$_2$CH$_2$—, H$_2$C=CHCH$_2$CH$_2$CH$_2$—, H$_2$C=CHCH$_2$CH$_2$CH$_2$CH$_2$, HC≡C—, HC≡CCH$_2$—, HC≡CC(CH$_3$)—, HC≡CC(CH$_3$)$_2$—, HC≡CC(CH$_3$)$_2$CH$_2$—, an acrylate, or an alkylacrylate.

31. A method in accordance with claim 25 characterised in that the (b) organic oligomer has at least two unsaturated end groups and is selected from the group of polystyrene and/or substituted polystyrenes, linear and or branched αΩ dienes, acetylene terminated oligophenylenes, polyetheramides, vinylbenzyl terminated aromatic polysulphones, aromatic polyester based monomers and a linear predominantly oxyalkylene polymer comprised of recurring oxyalkylene units, (—C$_n$H$_{2n}$—O—) where n is a whole number between 2 and 4 inclusive.

32. A method in accordance with claim 25 characterised in that the extender and/or plasticiser is selected from one or more of the group of trialkylsilyl terminated polydialkyl siloxanes, polyisobutylenes (PIB), phosphate esters polyalkylbenzenes, linear and/or branched alkylbenzenes esters of aliphatic monocarboxylic acids.

33. A method in accordance with claim 25 wherein the extender and/or plasticiser is further defined as a mineral oil or mixture thereof having at least one of the following parameters:
   (i) a molecular weight of greater than 150;
   (ii) an initial boiling point equal to or greater than 230° C. (according to ASTM D 86);
   (iii) a viscosity density constant value of less than or equal to 0.9; (according to ASTM 2501);
   (iv) an average of at least 12 carbon atoms per molecule;
   (v) an aniline point equal to or greater than 70° C. (according to ASTM D 611);
   (vi) a naphthenic content of from 20 to 70% by weight of the extender and in the case of mineral oil based extenders a paraffinic content of from 30 to 80% by weight of the extender (according to ASTM D 3238);
   (vii) a pour point of from −50 to 60° C. (according to ASTM D 97);
   (viii) a kinematic viscosity of from 1 to 20 cSt at 40° C. (according to ASTM D 445);
   (ix) a specific gravity of from 0.7 to 1.1 (according to ASTM D1298);
   (x) a refractive index of from 1.1 to 1.8 at 20° C. (according to ASTM D 1218);
   (xi) a density at 15° C. of greater than 700 kg/m$^3$ (according to ASTM D4052);
   (xii) a flash point of greater than 100° C. (according to ASTM D 93);
   (xiii) a saybolt colour of at least +30 (according to ASTM D 156);
   (xiv) a water content of less than or equal to 250 ppm;
   (xv) a Sulphur content of less than 2.5 ppm (according to ASTM D 4927).

* * * * *